United States Patent
Raghu

(10) Patent No.: US 9,389,893 B2
(45) Date of Patent: *Jul. 12, 2016

(54) METHOD AND SYSTEM FOR MIGRATION OF VIRTUAL MACHINES AND VIRTUAL APPLICATIONS BETWEEN CLOUD-COMPUTING FACILITIES THROUGH MULTIPLEXED SECURE TUNNELS

(71) Applicant: VMware, Inc., Palo Alto, CA (US)

(72) Inventor: Jagannath Raghu, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 214 days.

This patent is subject to a terminal disclaimer.

(21) Appl. No.: 14/094,506

(22) Filed: Dec. 2, 2013

(65) Prior Publication Data

US 2015/0052523 A1    Feb. 19, 2015

Related U.S. Application Data

(63) Continuation-in-part of application No. 13/966,094, filed on Aug. 13, 2013.

(51) Int. Cl.
*G06F 9/455* (2006.01)
*G06F 9/48* (2006.01)
*H04L 29/06* (2006.01)
*H04L 12/46* (2006.01)

(52) U.S. Cl.
CPC ........ *G06F 9/45533* (2013.01); *G06F 9/45558* (2013.01); *G06F 9/4856* (2013.01); *H04L 63/0272* (2013.01); *G06F 2009/4557* (2013.01); *H04L 12/4641* (2013.01)

(58) Field of Classification Search
CPC ....... G06F 9/50; G06F 9/45558; G06F 9/455; G06F 9/45533; G06F 9/4856; G06F 2009/4557; H04L 63/0272
See application file for complete search history.

(56) References Cited

U.S. PATENT DOCUMENTS

| | | | |
|---|---|---|---|
| 7,577,722 B1 * | 8/2009 | Khandekar et al. | 709/220 |
| 9,037,723 B2 * | 5/2015 | Morgan | 709/226 |
| 2006/0080421 A1 * | 4/2006 | Hu | 709/223 |
| 2007/0168458 A1 * | 7/2007 | Costa-Requena et al. | 709/217 |
| 2009/0064136 A1 * | 3/2009 | Dow et al. | 718/1 |
| 2012/0137287 A1 * | 5/2012 | Pang et al. | 718/1 |
| 2012/0278804 A1 | 11/2012 | Narayanasamy et al. | |
| 2013/0097296 A1 * | 4/2013 | Gehrmann et al. | 709/223 |
| 2014/0280738 A1 * | 9/2014 | Kolker et al. | 709/218 |

* cited by examiner

*Primary Examiner* — Lewis A Bullock, Jr.
*Assistant Examiner* — Jacob Dascomb

(57) ABSTRACT

The current document discloses methods and systems for extending an internal network within a first cloud-computing facility to a second cloud-computing facility and deploying a virtual machine or virtual application previously running on a first cloud-computing facility within the context of the extended internal network in the second cloud-computing facility. The currently disclosed methods and systems which provide internal-network extension and redeployment of virtual machines and virtual applications, referred to as "stretch deploy," allow a virtual machine or virtual application formerly executing on a first cloud-computing facility to resume execution on a second cloud-computing facility, using the computational and storage facilities of the second cloud-computing facility but depending on network support from the first cloud-computing facility, without changing IP and local network addresses and the network connectivity, based on those addresses, between the virtual machines and virtual applications and other local and remote computational entities with which the virtual machines and virtual applications communicate. Multiplexing multiple stretch deployed L2 networks over the same secure (SSL-VPN) tunnel, terminating on organization edges.

16 Claims, 43 Drawing Sheets

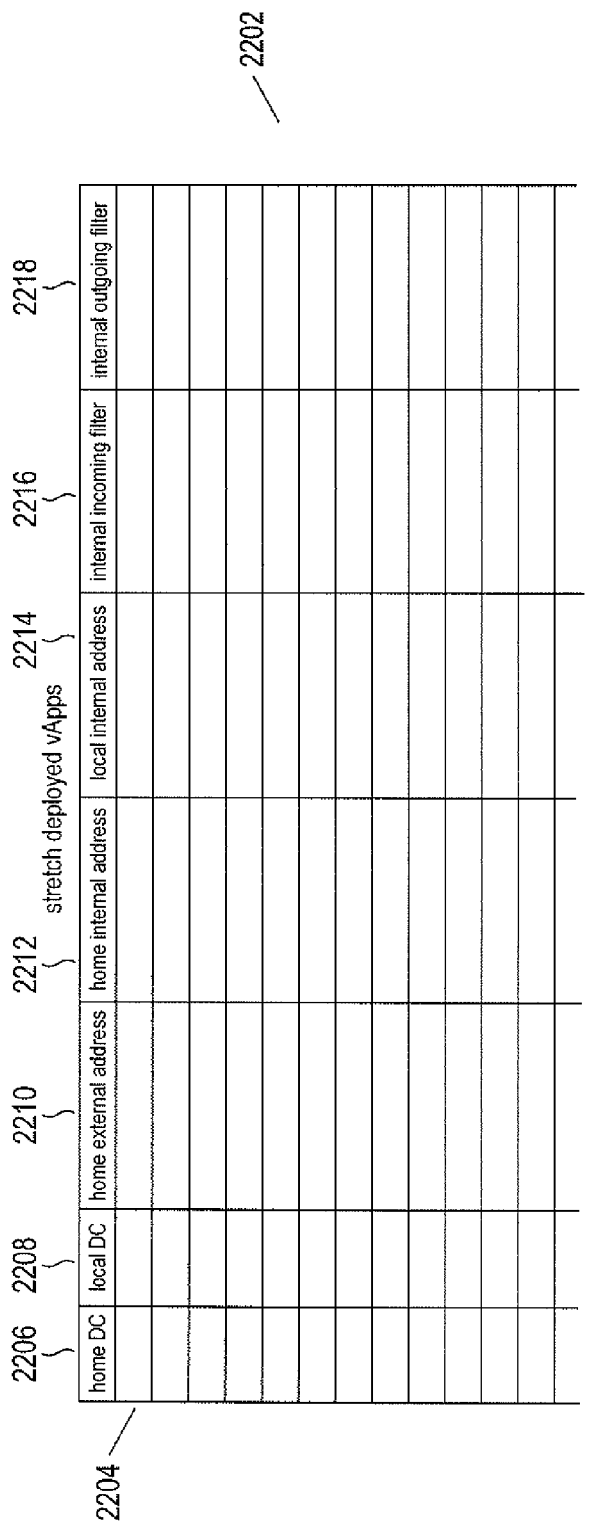
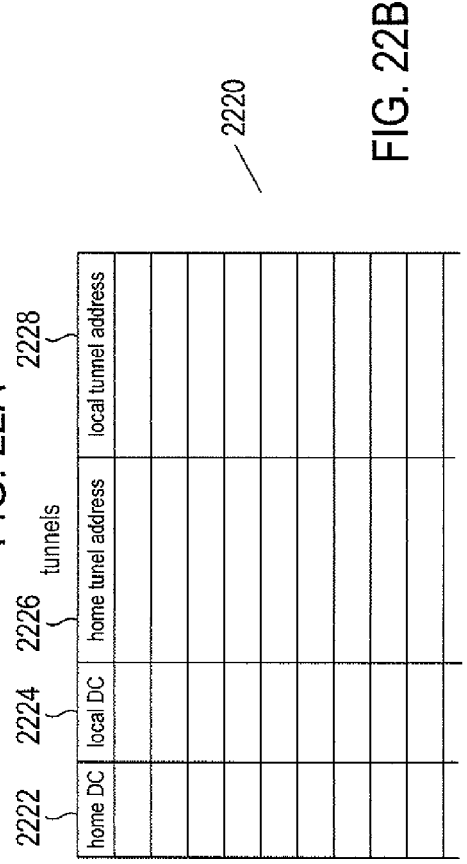
FIG. 22A
FIG. 22B

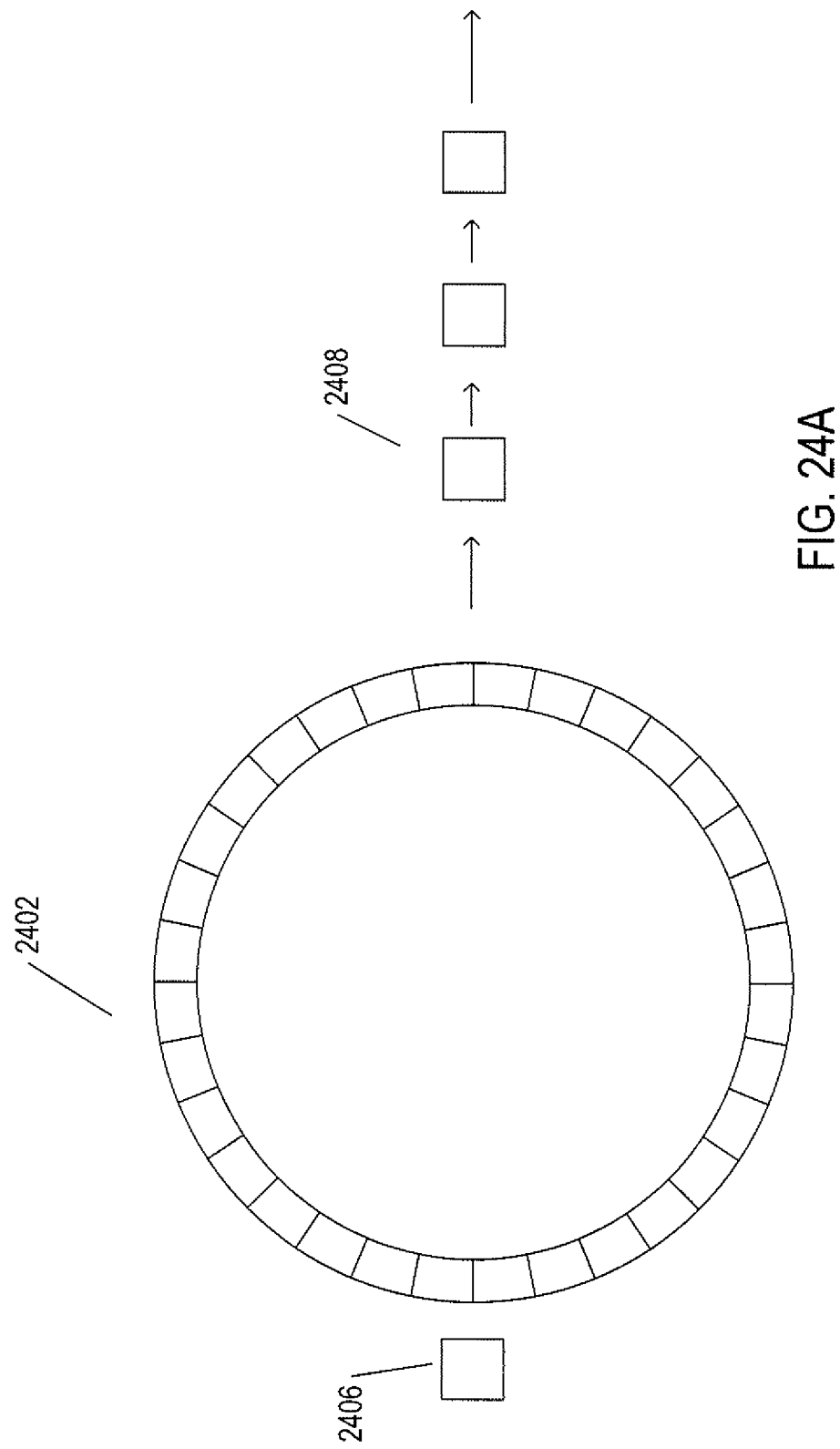

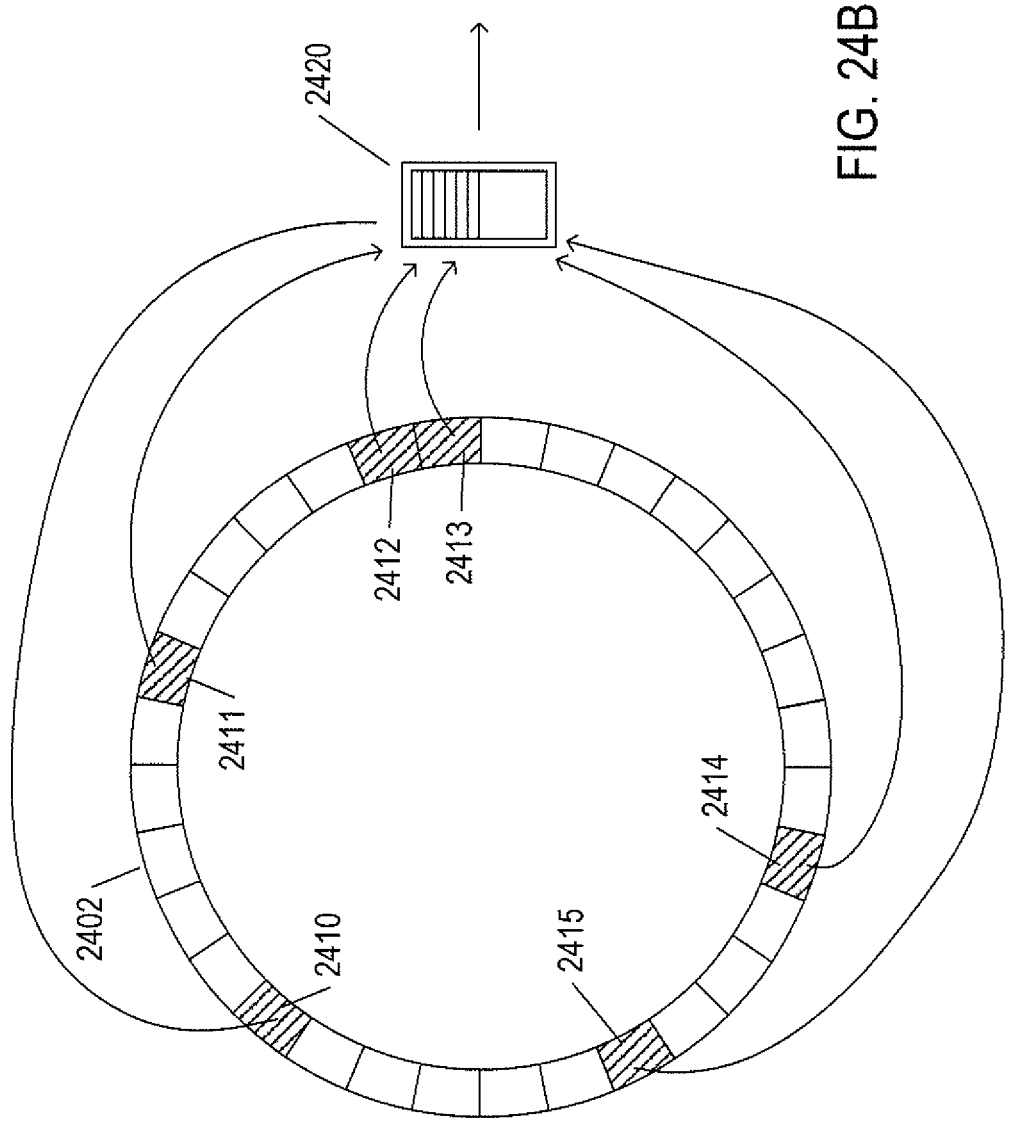

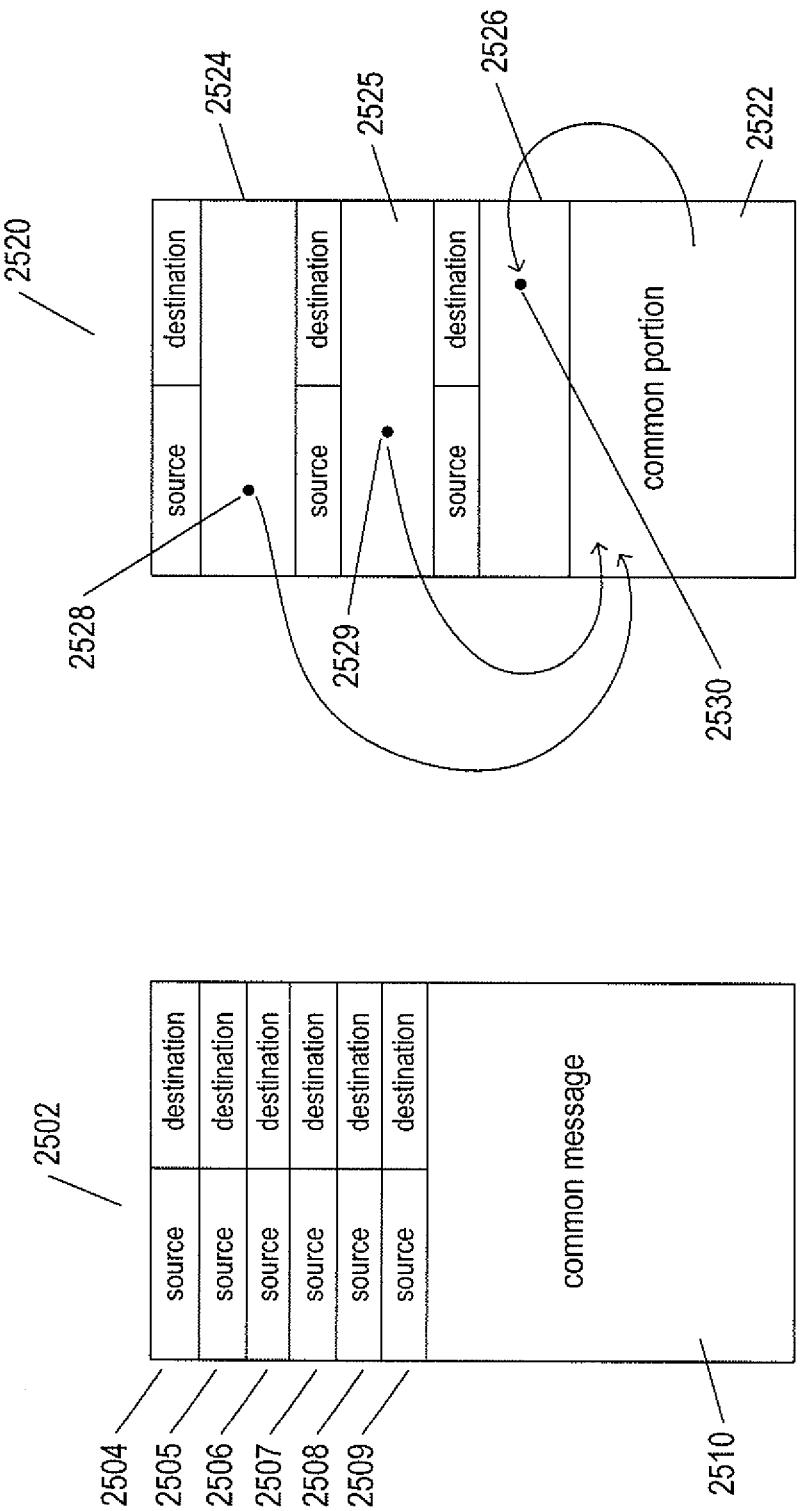

METHOD AND SYSTEM FOR MIGRATION OF VIRTUAL MACHINES AND VIRTUAL APPLICATIONS BETWEEN CLOUD-COMPUTING FACILITIES THROUGH MULTIPLEXED SECURE TUNNELS

CROSS-REFERENCE TO RELATED APPLICATION

This application is a continuation-in-part of U.S. application Ser. No. 13/966,094, filed Aug. 13, 2013

TECHNICAL FIELD

The present patent application is directed to virtual-machine-based computing and cloud computing and, in particular, to methods and systems for moving virtual machines and virtual applications from a source cloud to a destination cloud without reconfiguration of the virtual machines and virtual applications by using secure VPN tunnels to stretch multiple layer-2 networks.

BACKGROUND

The development and evolution of modern computing has, in many ways, been facilitated by the power of logical abstraction. Early computers were manually programmed by slow and tedious input of machine instructions into the computers' memories. Over time, assembly-language programs and assemblers were developed in order to provide a level of abstraction, namely assembly-language programs, above the machine-instruction hardware-interface level, to allow programmers to more rapidly and accurately develop programs. Assembly-language-based operations are more easily encoded by human programmers than machine-instruction-based operations, and assemblers provided additional features, including assembly directives, routine calls, and a logical framework for program development. The development of operating systems provided yet another type of abstraction that provided programmers with logical, easy-to-understand system-call interfaces to computer-hardware functionality. As operating systems developed, additional internal levels of abstraction were created within operating systems, including virtual memory, implemented by operating-system paging of memory pages between electronic memory and mass-storage devices, which provided easy-to-use, linear memory-address spaces much larger than could be provided by the hardware memory of computer systems. Additional levels of abstractions were created in the programming-language domain, with compilers developed for a wide variety of compiled languages that greatly advanced the ease of programming and the number and capabilities of programming tools with respect those provided by assemblers and assembly languages. Higher-level scripting languages and special-purpose interpreted languages provided even higher levels of abstraction and greater ease of application development in particular areas. Similarly, block-based and sector-based interfaces to mass-storage devices have been abstracted through many levels of abstraction to modern database management systems, which provide for high-available and fault-tolerant storage of structured data that can be analyzed, interpreted, and manipulated through powerful high-level query languages.

In many ways, a modern computer system can be thought of as many different levels of abstractions along many different, often interdependent, dimensions. More recently, powerful new levels of abstraction have been developed with respect to virtual machines, which provide virtual execution environments for application programs and operating systems. Virtual-machine technology essentially abstracts the hardware resources and interfaces of a computer system on behalf of one or multiple virtual machines, each comprising one or more application programs and an operating system. Even more recently, the emergence of cloud computing services can provide abstract interfaces to enormous collections of geographically dispersed data centers, allowing computational service providers to develop and deploy complex Internet-based services that execute on tens or hundreds of physical servers through abstract cloud-computing interfaces.

Within virtual servers as well as physical servers, virtual machines and virtual applications can be moved among multiple virtual or physical processors in order to facilitate load balancing and to collocate compatible virtual machines and virtual applications with respect to virtual and physical processors. Similarly, virtual machines and virtual applications can be moved among the virtual servers within a virtual data center as well as among physical servers within the underlying physical hardware within which virtual data centers are constructed. Migration of virtual machines and virtual applications within virtual data centers can also be used for load balancing, fault tolerance and high availability, and for many other purposes. Designers, developers, vendors, and users of virtualization technology continue to seek new facilities within emerging layers of virtualization for movement of virtual machines and virtual applications in order to achieve many different types of goals, from load balancing, fault tolerance, and high availability to minimization of costs, efficient geographic distribution, and other such goals.

SUMMARY

The current document discloses methods and systems for extending an internal network within a first cloud-computing facility to a second cloud-computing facility and deploying a virtual machine or virtual application previously running on a first cloud-computing facility within the context of the extended internal network in the second cloud-computing facility. The currently disclosed methods and systems which provide internal-network extension and redeployment of virtual machines and virtual applications, referred to as "stretch deploy," allow a virtual machine or virtual application formerly executing on a first cloud-computing facility to resume execution on a second cloud-computing facility, using the computational and storage facilities of the second cloud-computing facility but depending on network support from the first cloud-computing facility, without changing IP and local network addresses and the network connectivity, based on those addresses, between the virtual machines and virtual applications and other local and remote computational entities with which the virtual machines and virtual applications communicate. This document discloses approaches to extend multiple such networks or do multiple stretch deploys over a single VPN tunnel.

BRIEF DESCRIPTION OF THE DRAWINGS

FIGS. 22A-B illustrate the types of information stored within an organization-edge appliance to facilitate construction of a VPN tunnel and to facilitate multiple stretch-deploy operations through the VPN tunnel.

FIGS. 24A-25B illustrate certain of the variety of compression and deduplication processing that can be carried out by enhanced organization-edge appliances for messages transmitted over multiple stretch-deployed networks multiplexed within a single VPN tunnel.

DETAILED DESCRIPTION

Figure 1:
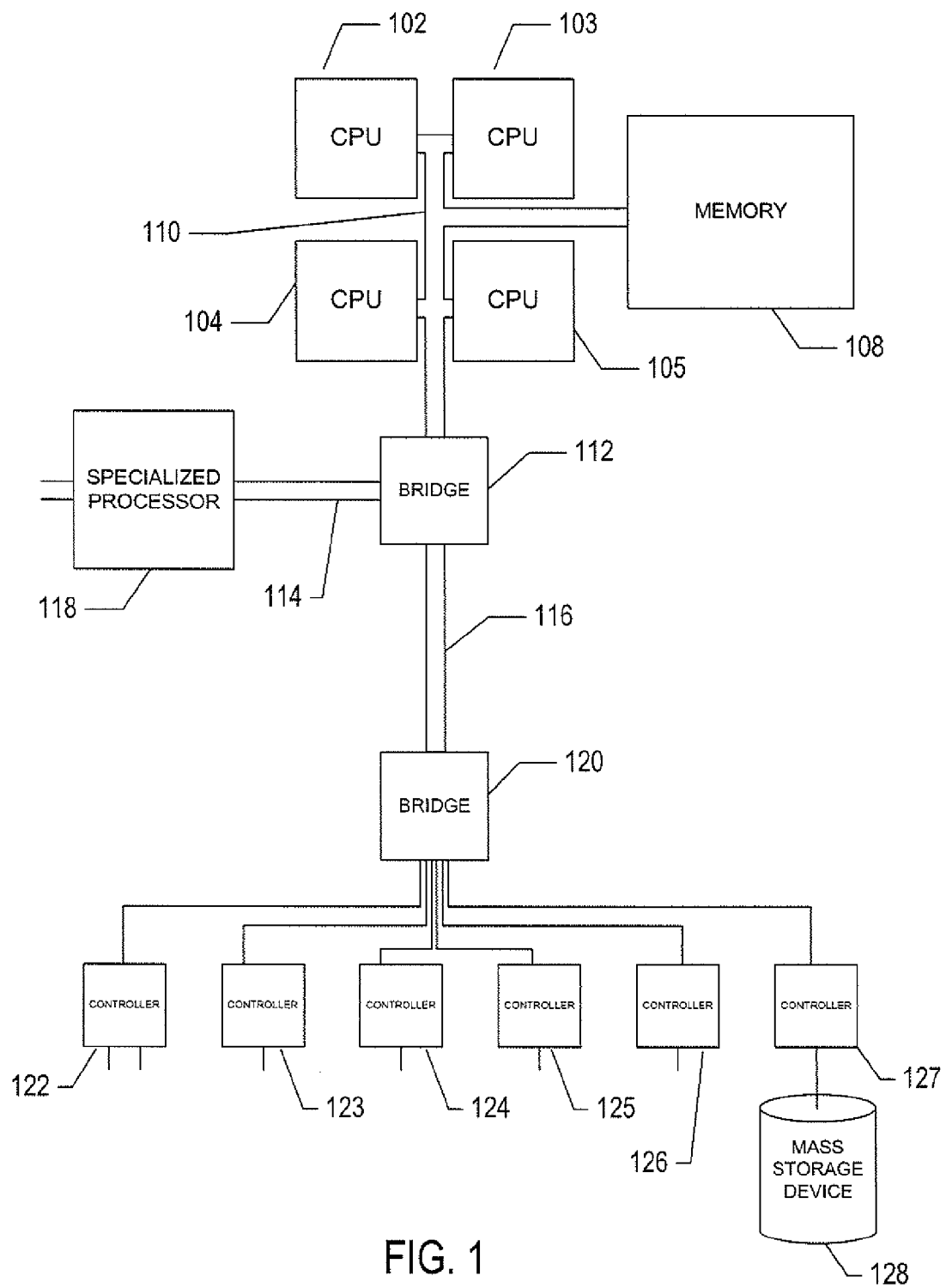
FIG. 1 provides a general architectural diagram for various types of computers.

As discussed above, modern computing can be considered to be a collection of many different levels of abstraction above the physical computing-hardware level that includes physical computer systems, data-storage systems and devices, and communications networks. The present application is related to a multi-cloud-aggregation level of abstraction that provides homogenous-cloud and heterogeneous-cloud distributed management services, each cloud generally an abstraction of a large number of virtual resource pools comprising processing, storage, and network resources, each of which, in turn, can be considered to be a collection of abstractions above underlying physical hardware devices. The current document is directed to providing a straightforward and efficient method for the migration of virtual machines and virtual applications among virtual data centers within different cloud-computing facilities at the cloud-computing and virtual-data-center levels of abstraction.

Computer Architecture, Virtualization, Electronic Communications, and Virtual Networks The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential control component of processor-controlled machines and devices, no less essential than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
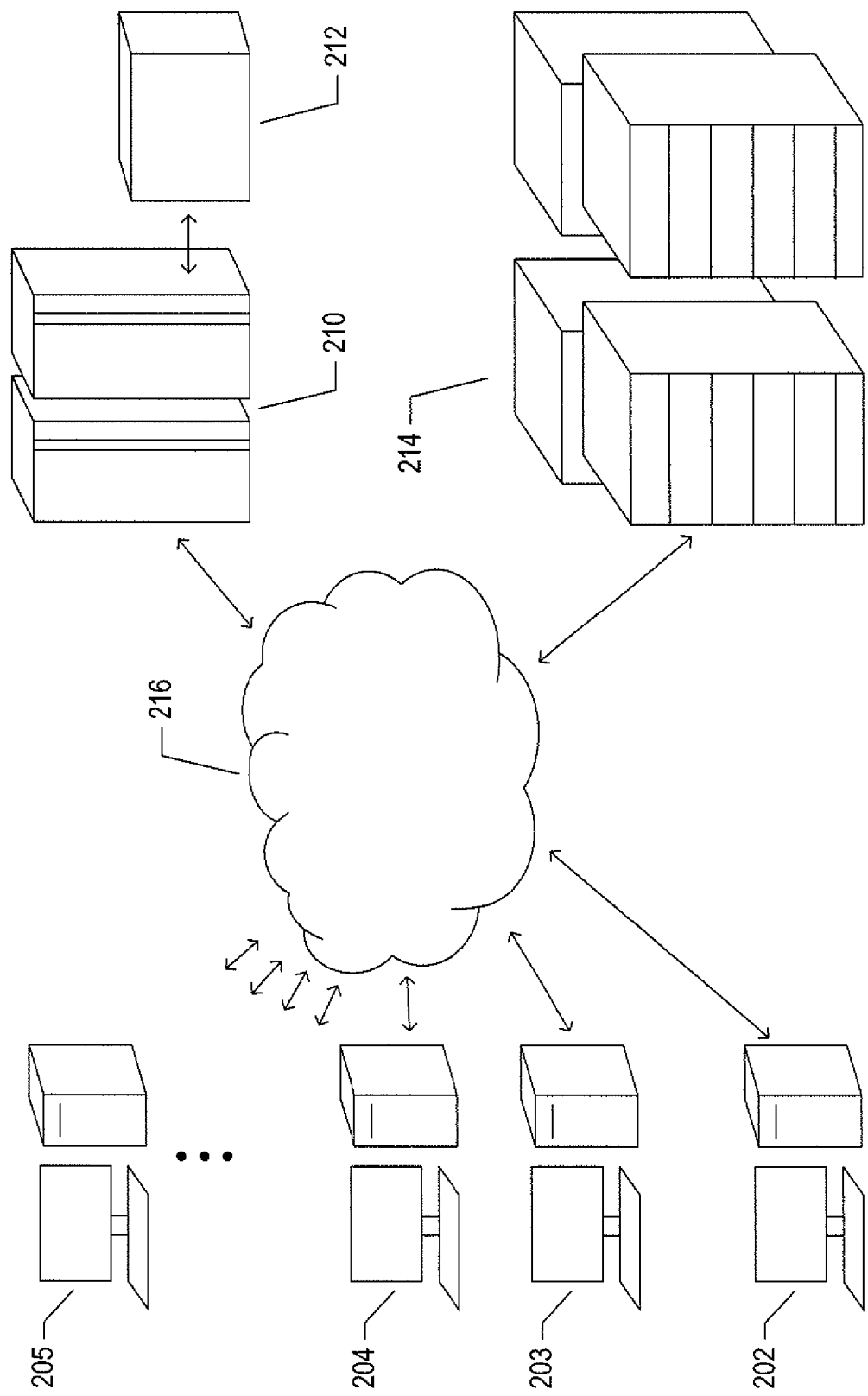
FIG. 2 illustrates an Internet-connected distributed computer system.

FIG. 2 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
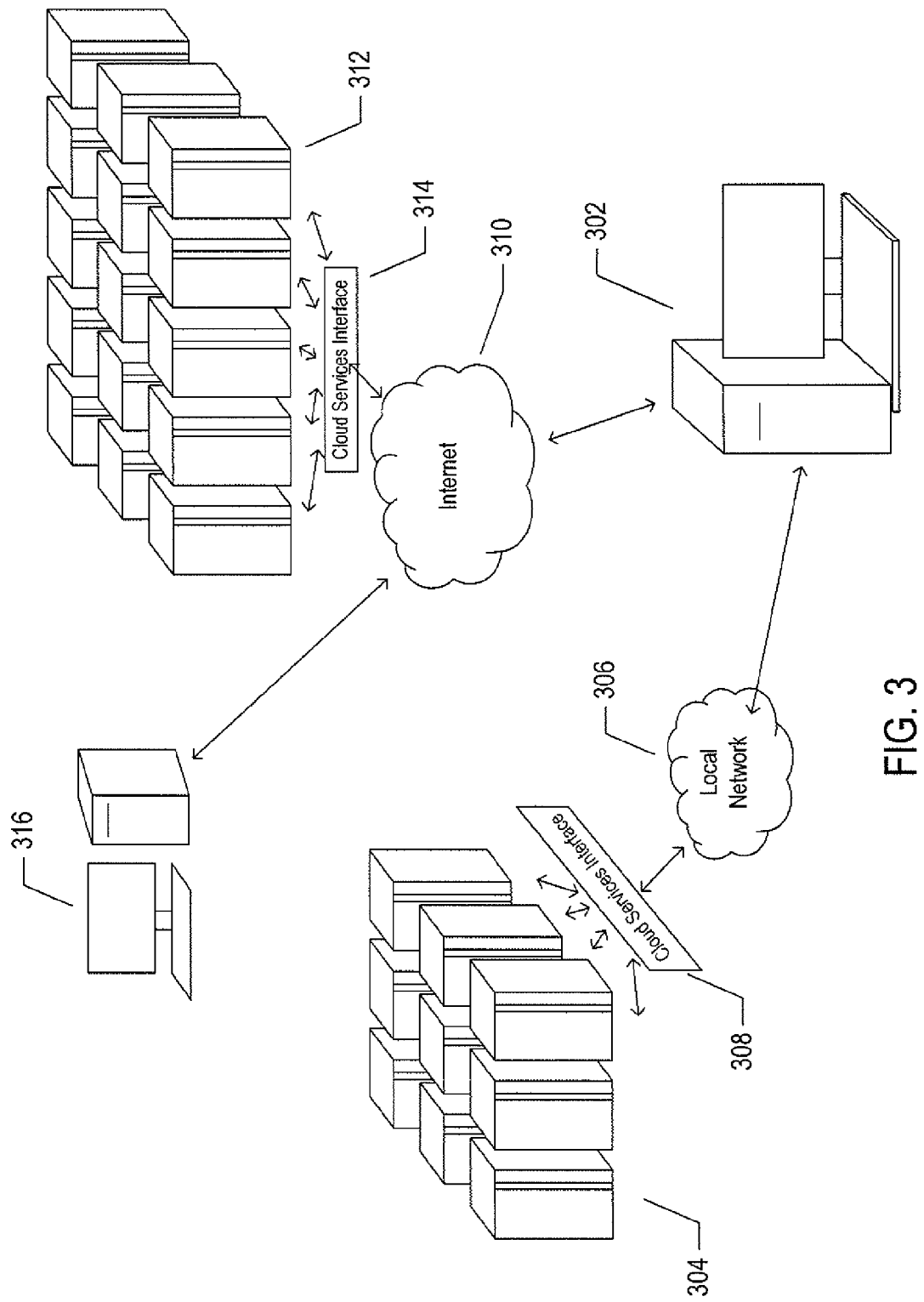
FIG. 3 illustrates cloud computing.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
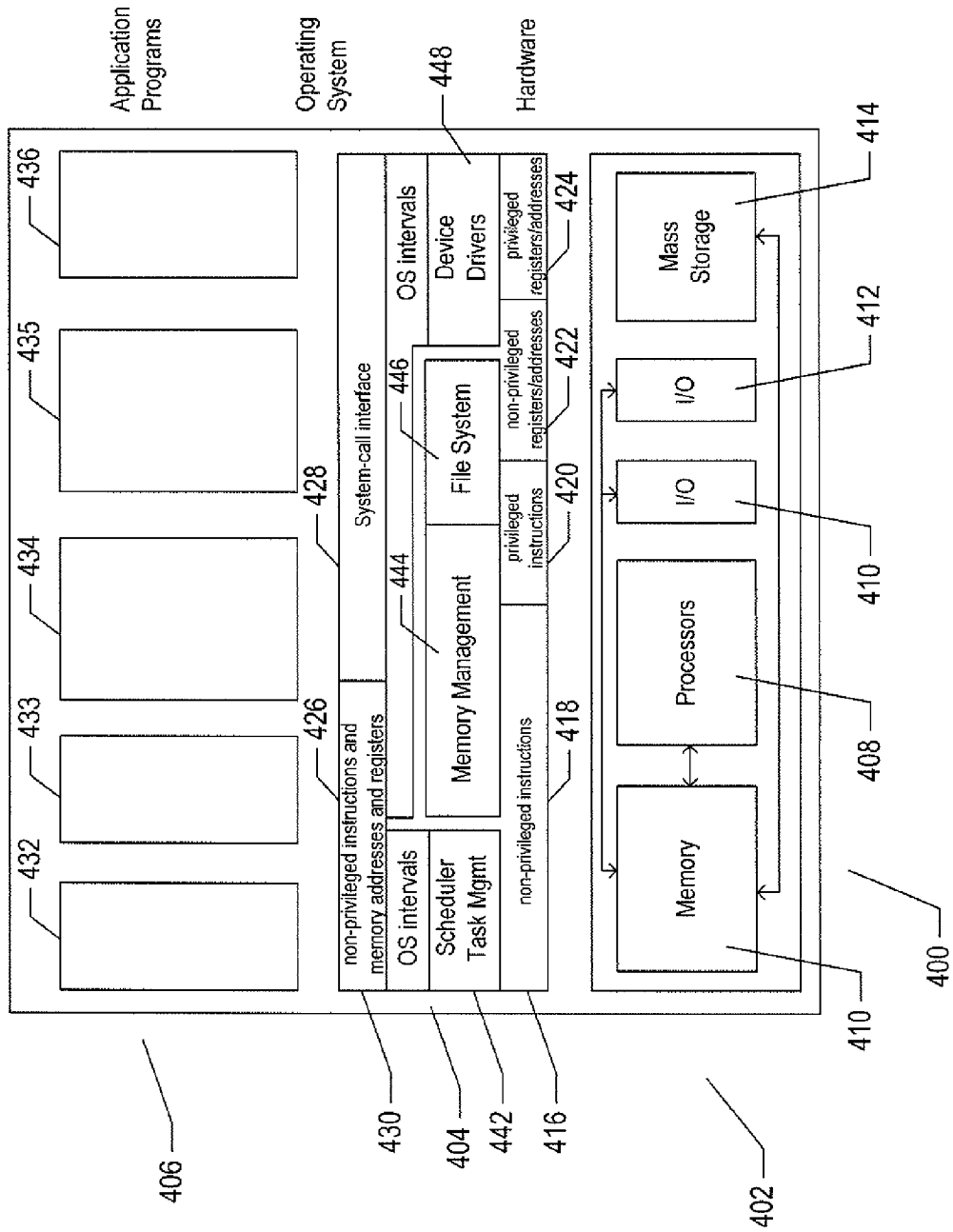
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5:
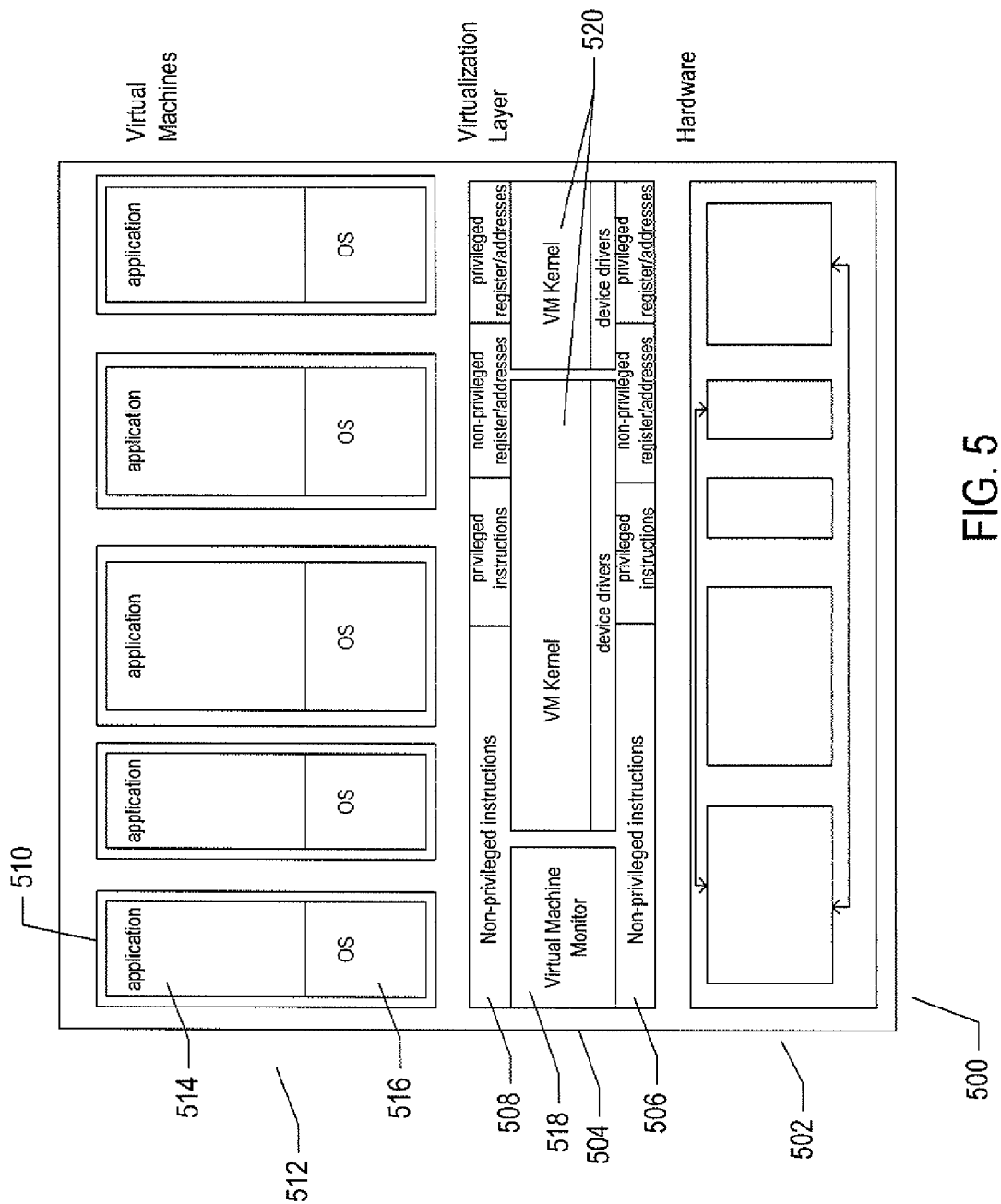
FIG. 5 illustrates one type of virtual machine and virtual-machine execution environment.

For all of these reasons, a higher level of abstraction, referred to as the "virtual machine," has been developed and evolved to further abstract computer hardware in order to address many difficulties and challenges associated with traditional computing systems, including the compatibility issues discussed above. FIG. 5 illustrates one type of virtual machine and virtual-machine execution environment. FIG. 5 uses the same illustration conventions as used in FIG. 4. In particular, the computer system 500 in FIG. 5 includes the same hardware layer 502 as the hardware layer 402 shown in FIG. 4. However, rather than providing an operating system layer directly above the hardware layer, as in FIG. 4, the virtualized computing environment illustrated in FIG. 5 features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, such as application 514 and operating system 516 packaged together within virtual machine 510. Each virtual machine is thus equivalent to the operating-system layer 404 and application-program layer 406 in the general-purpose computer system shown in FIG. 4. Each operating system within a virtual machine interfaces to the virtualization-layer interface 508 rather than to the actual hardware interface 506. The virtualization layer partitions hardware resources into abstract virtual-hardware layers to which each operating system within a virtual machine interfaces. The operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different operating systems. For example, the virtualization layer is generally able to provide virtual hardware interfaces for a variety of different types of computer hardware. This allows, as one example, a virtual machine that includes an operating system designed for a particular computer architecture to run on hardware of a different architecture. The number of virtual machines need not be equal to the number of physical processors or even a multiple of the number of processors. The virtualization layer includes a virtual-machine-monitor module 518 that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the operating system within a virtual machine accesses virtual privileged instructions, virtual privileged registers, and virtual privileged memory through the virtualization-layer interface 508, the accesses may result in execution of virtualization-layer code to simulate or emulate the privileged resources. The virtualization layer additionally includes a kernel module 520 that manages memory, communications, and data-storage machine resources on behalf of executing virtual machines. The kernel, for example, may maintain shadow page tables on each virtual machine so that hardware-level virtual-memory facilities can be used to process memory accesses. The kernel may additionally include routines that implement virtual communications and data-storage devices as well as device drivers that directly control the operation of underlying hardware communications and data-storage devices. Similarly, the kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

Figure 6:
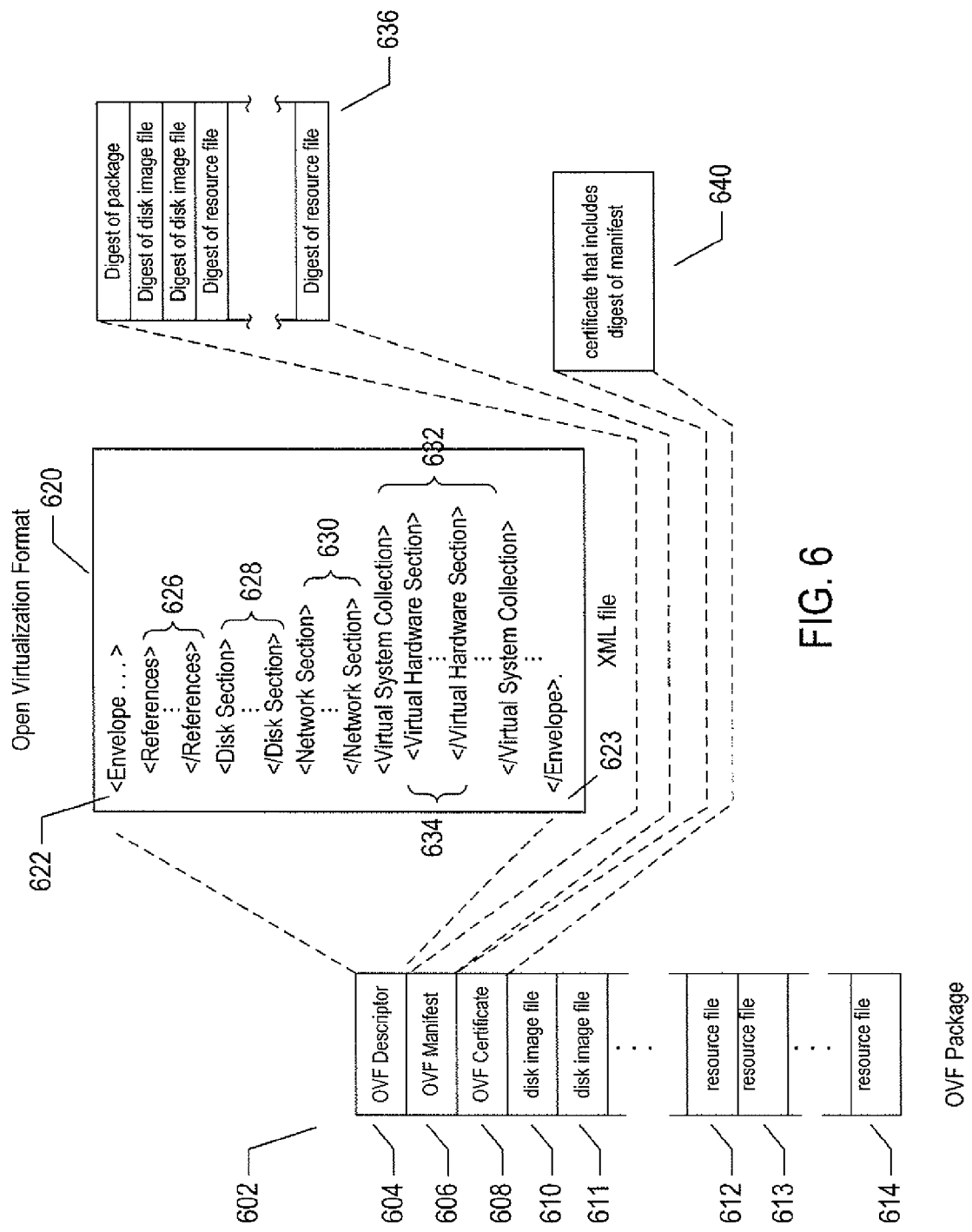
FIG. 6 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
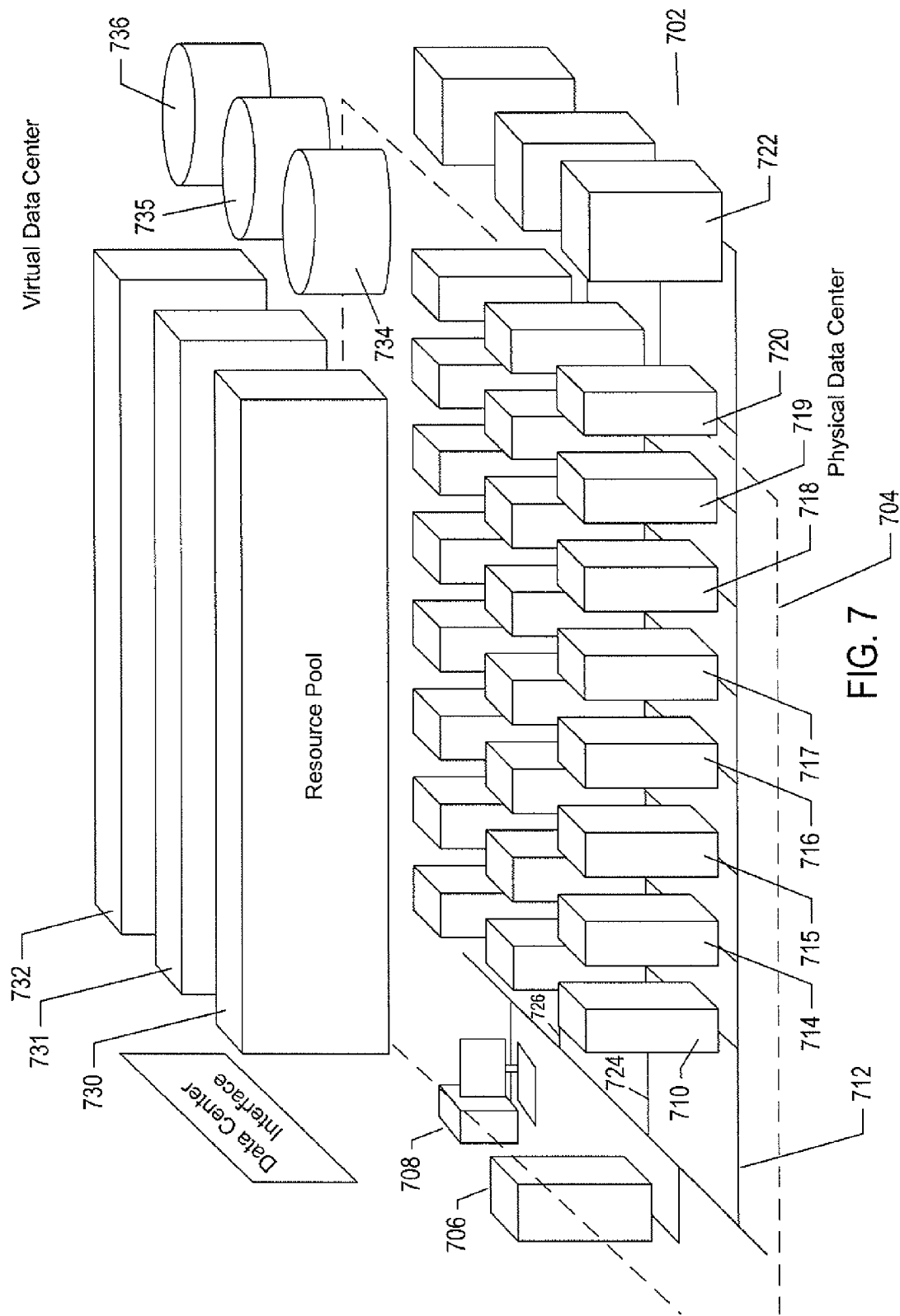
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-data-center management server 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the virtual-data-center management server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability.

Figure 8:
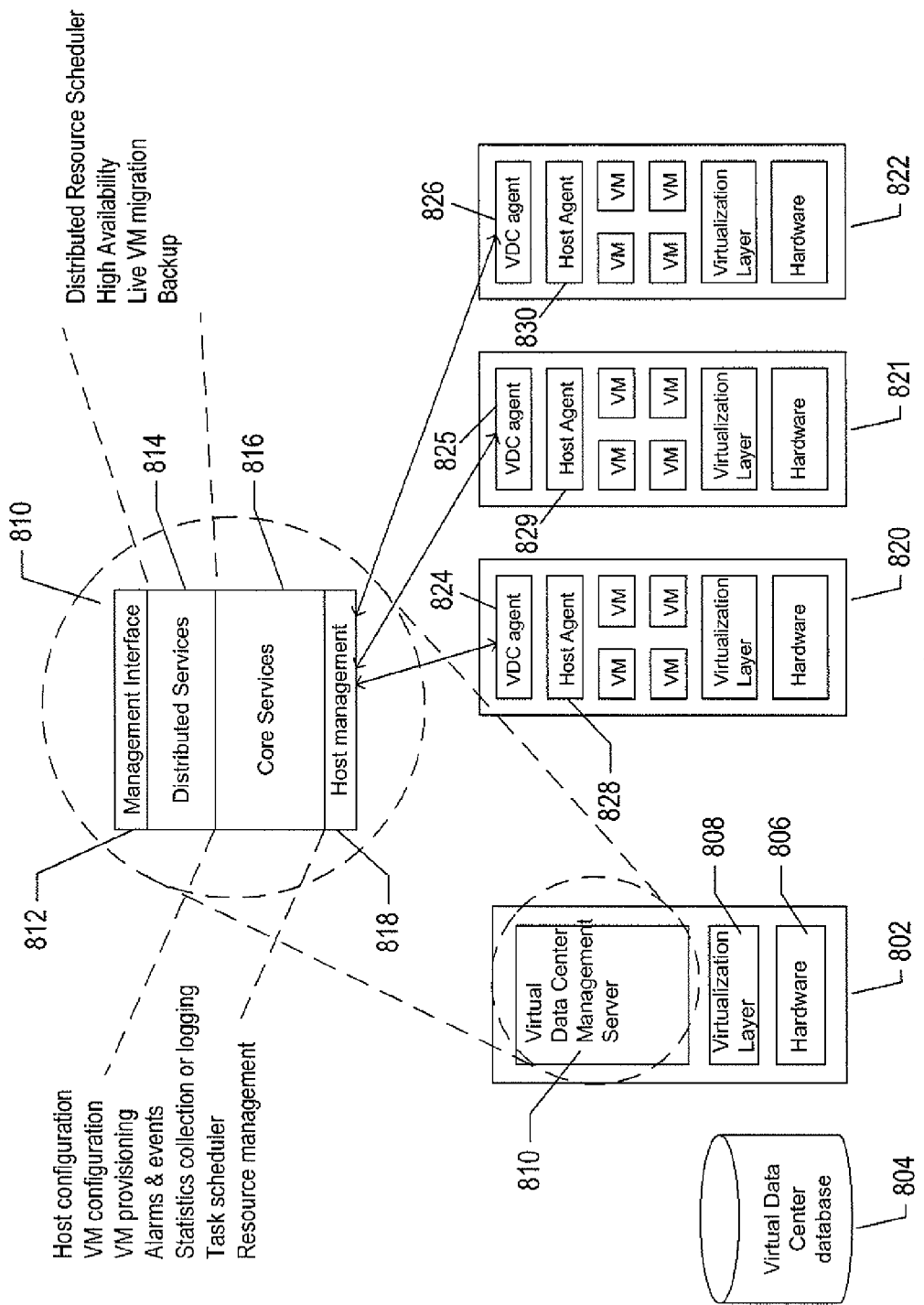
FIG. 8 illustrates virtual-machine components of a virtual-data-center management server and physical servers of a physical data center above which a virtual-data-center interface is provided by the virtual-data-center management server.

FIG. 8 illustrates virtual-machine components of a virtual-data-center management server and physical servers of a physical data center above which a virtual-data-center interface is provided by the virtual-data-center management server. The virtual-data-center management server 802 and a virtual-data-center database 804 comprise the physical components of the management component of the virtual data center. The virtual-data-center management server 802 includes a hardware layer 806 and virtualization layer 808, and runs a virtual-data-center management-server virtual machine 810 above the virtualization layer. Although shown as a single server in FIG. 8, the virtual-data-center management server ("VDC management server") may include two or more physical server computers that support multiple VDC-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VDC management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VDC management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("APP"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VDC management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
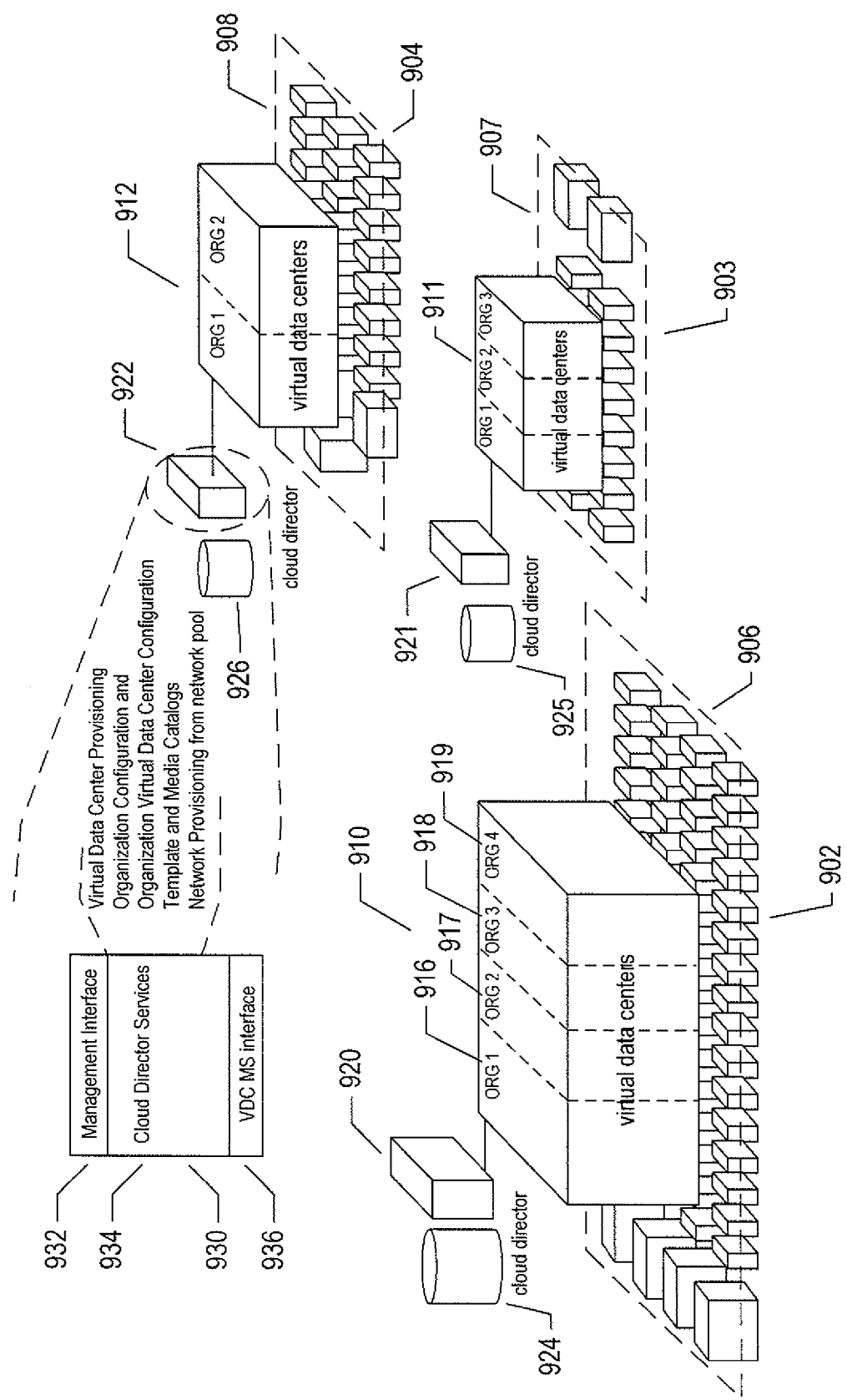
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities. The present application is directed to providing an additional layer of abstraction to facilitate aggregation of cloud-computing facilities.

Figure 10:
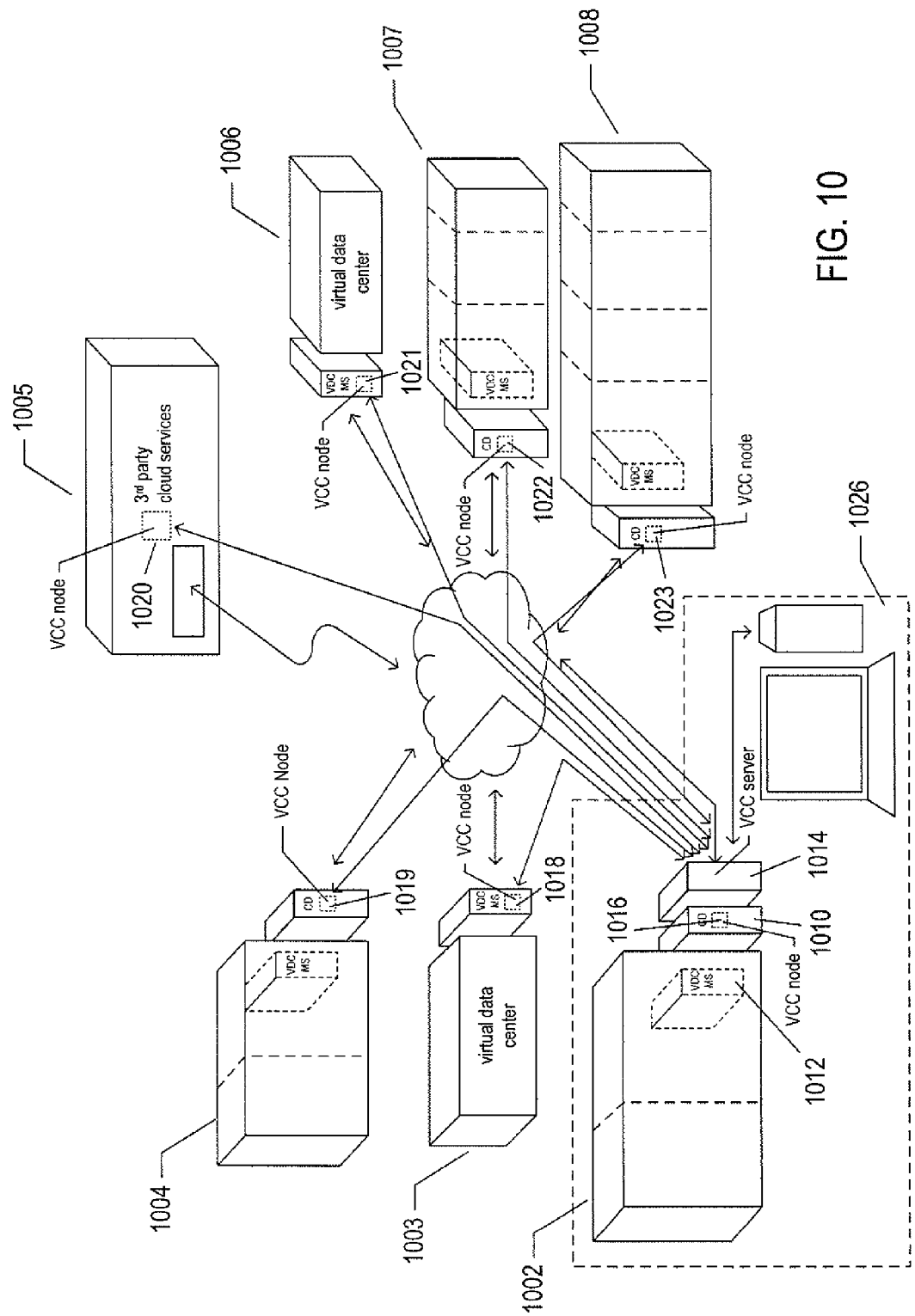
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. In FIG. 10, seven different cloud-computing facilities are illustrated 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Figure 11:
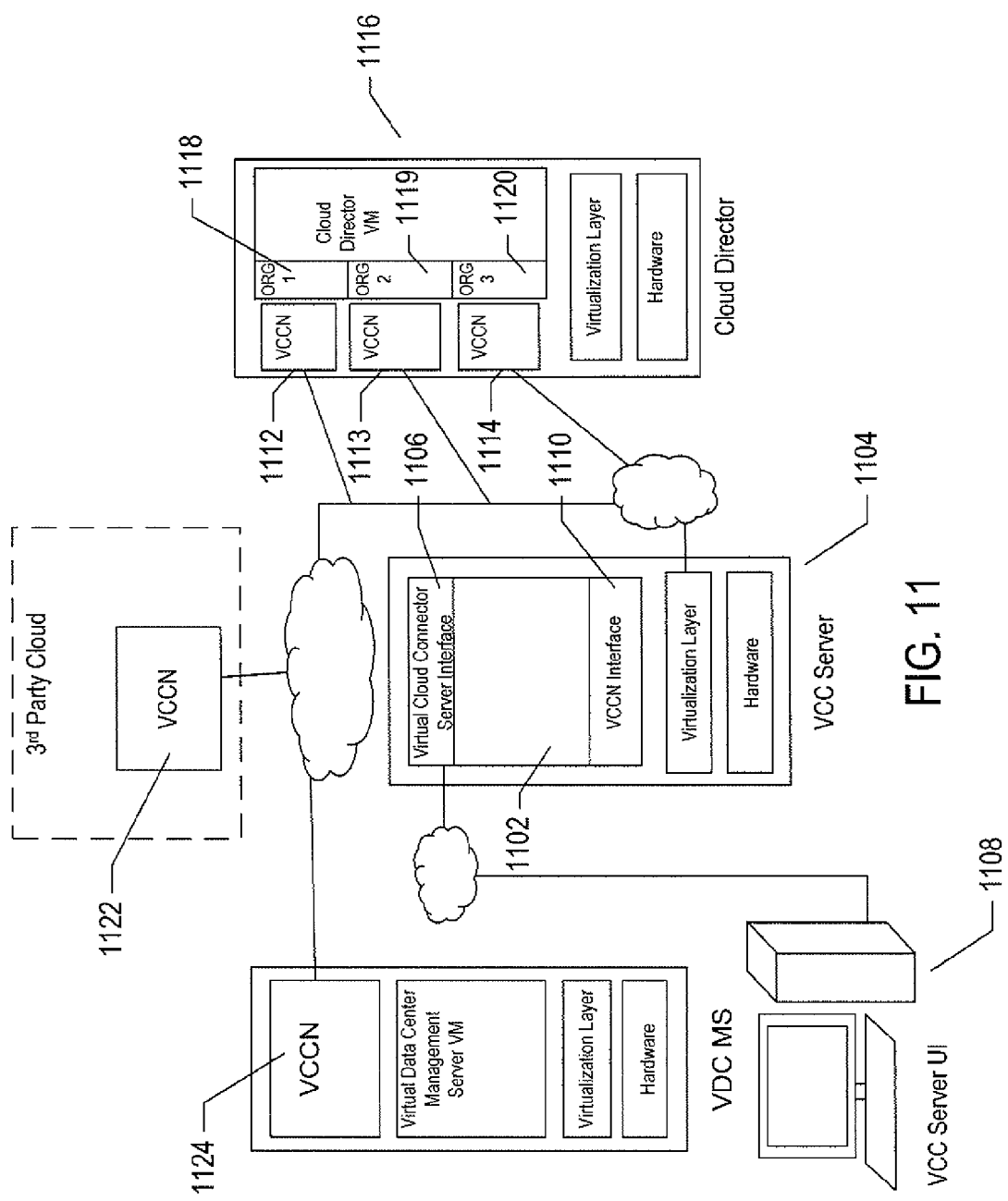
FIG. 11 illustrates the VCC server and VCC nodes in a slightly different fashion than the VCC server and VCC nodes are illustrated in FIG. 10.

FIG. 11 illustrates the VCC server and VCC nodes in a slightly different fashion than the VCC server and VCC nodes are illustrated in FIG. 10. In FIG. 11, the VCC server virtual machine 1102 is shown executing within a VCC server 1104, one or more physical servers located within a private cloud-computing facility. The VCC-server virtual machine includes a VCC-server interface 1106 through which a terminal, PC, or other computing device 1108 interfaces to the VCC server. The VCC server, upon request, displays a VCC-server user interface on the computing device 1108 to allow a cloud-aggregate administrator or other user to access VCC-server-provided functionality. The VCC-server virtual machine additionally includes a VCC-node interface 1108 through which the VCC server interfaces to VCC-node virtual appliances that execute within VDC management servers, cloud directors, and third-party cloud-computing facilities. As shown in FIG. 11, in one implementation, a VCC-node virtual machine is associated with each organization configured within and supported by a cloud director. Thus, VCC nodes 1112-1114 execute as virtual appliances within cloud director 1116 in association with organizations 1118-1120, respectively. FIG. 11 shows a VCC-node virtual machine 1122 executing within a third-party cloud-computing facility and a VCC-node virtual machine 1124 executing within a VDC management server. The VCC server, including the services provided by the VCC-server virtual machine 1102, in conjunction with the VCC-node virtual machines running within remote VDC management servers, cloud directors, and within third-party cloud-computing facilities, together provide functionality distributed among the cloud-computing-facility components of either heterogeneous or homogeneous cloud-computing aggregates.

Figure 12:
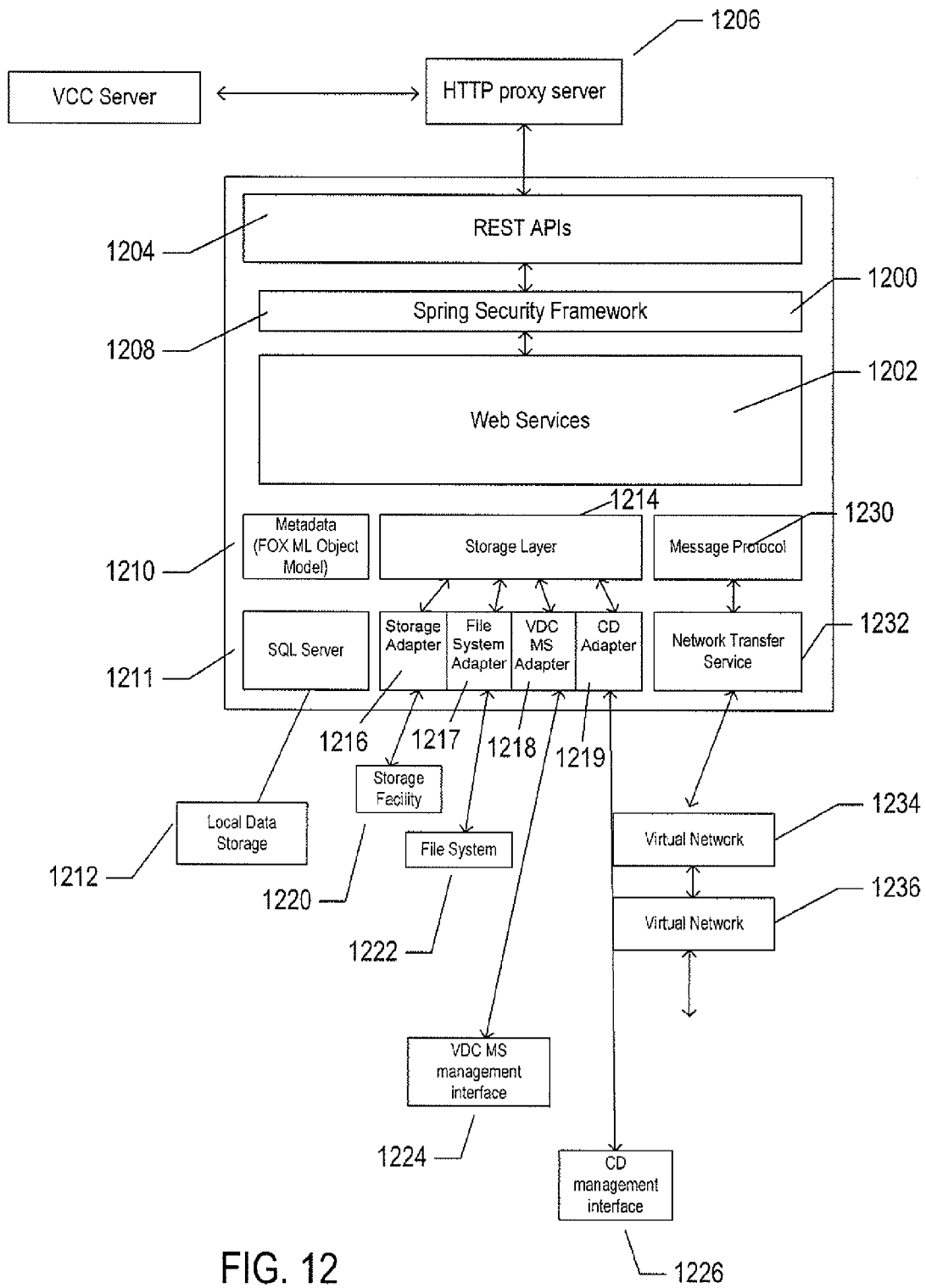
FIG. 12 illustrates one implementation of a VCC node.

FIG. 12 illustrates one implementation of a VCC node. The VCC node 1200 is a web service that executes within an Apache/Tomcat container that runs as a virtual appliance within a cloud director, VDC management server, or third-party cloud-computing server. The VCC node exposes web services 1202 to a remote VCC server via REST APIs accessed through the representational state transfer ("REST") protocol 1204 via a hypertext transfer protocol ("HTTP") proxy server 1206. The REST protocol uses HTTP requests to post data and requests for services, read data and receive service-generated responses, and delete data. The web services 1202 comprise a set of internal functions that are called to execute the REST APIs 1204. Authorization services are provided by a spring security layer 1208. The internal functions that implement the web services exposed by the REST APIs employ a metadata/object-store layer implemented using an SQL Server database 1210-1212, a storage layer 1214 with adapters 1216-1219 provides access to data stores 1220, file systems 1222, the virtual-data-center management-server management interface 1224, and the cloud-director management interface 1226. These adapters may additional include adapters to $3^{rd}$-party cloud management services, interfaces, and systems. The internal functions that implement the web services may also access a message protocol 1230 and network transfer services 1232 that allow for transfer of OVF packages and other files securely between VCC nodes via virtual networks 1234 that virtualize underlying physical networks 1236. The message protocol 1230 and network transfer services 1232 together provide for secure data transfer, multipart messaging, and checkpoint-restart data transfer that allows failed data transfers to be restarted from most recent checkpoints, rather than having to be entirely retransmitted.

Figure 13:
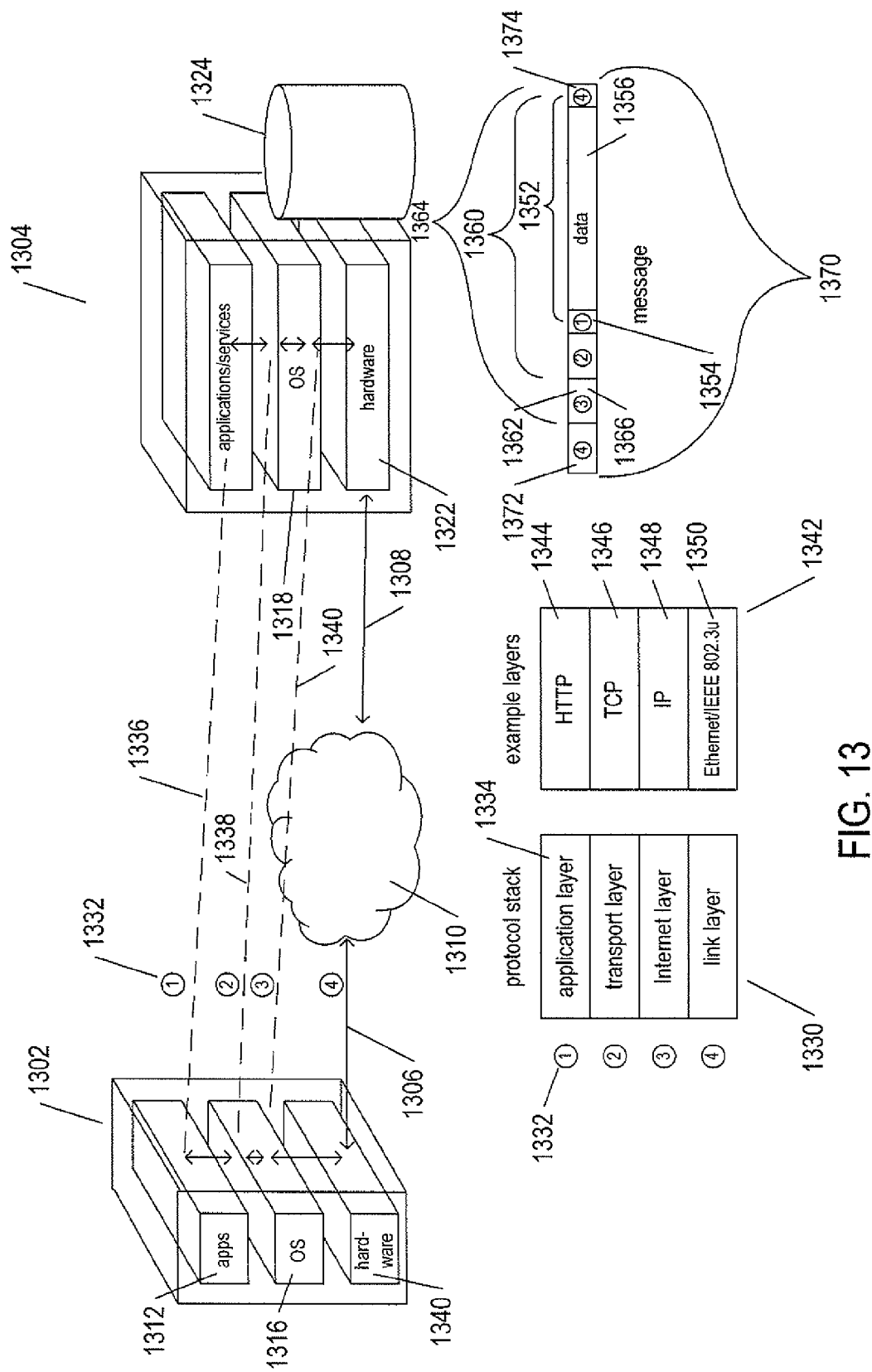
FIG. 13 illustrates electronic communications between a client and server computer.

FIG. 13 illustrates electronic communications between a client and server computer. The following discussion of FIG. 13 provides an overview of electronic communications. This is, however, a very large and complex subject area, a full discussion of which would likely run for many hundreds or thousands of pages. The following overview is provided as a basis for discussing communications stacks, with reference to subsequent figures. In FIG. 13, a client computer 1302 is shown to be interconnected with a server computer 1304 via local communication links 1306 and 1308 and a complex distributed intermediary communications system 1310, such as the Internet. This complex communications system may include a large number of individual computer systems and many types of electronic communications media, including wide-area networks, public switched telephone networks, wireless communications, satellite communications, and many other types of electronics-communications systems and intermediate computer systems, routers, bridges, and other device and system components. Both the server and client computers are shown to include three basic internal layers including an applications layer 1312 in the client computer and a corresponding applications and services layer 1314 in the server computer, an operating-system layer 1316 and 1318, and a hardware layer 1320 and 1322. The server computer 1304 is additionally associated with an internal, peripheral, or remote data-storage subsystem 1324. The hardware layers 1320 and 1322 may include the components discussed above with reference to FIG. 1 as well as many additional hardware components and subsystems, such as power supplies, cooling fans, switches, auxiliary processors, and many other mechanical, electrical, electromechanical, and electro-optical-mechanical components. The operating system 1316 and 1318 represents the general control system of both a client computer 1302 and a server computer 1304. The operating system interfaces to the hardware layer through a set of registers that, under processor control, are used for transferring data, including commands and stored information, between the operating system and various hardware components. The operating system also provides a complex execution environment in which various application programs, including database management systems, web browsers, web services, and other application programs execute. In many cases, modern computer systems employ an additional layer between the operating system and the hardware layer, referred to as a "virtualization layer," that interacts directly with the hardware and provides a virtual-hardware-execution environment for one or more operating systems.

Client systems may include any of many types of processor-controlled devices, including tablet computers, laptop computers, mobile smart phones, and other such processor-controlled devices. These various types of clients may include only a subset of the components included in a desktop personal component as well components not generally included in desktop personal computers.

Electronic communications between computer systems generally comprises packets of information, referred to as datagrams, transferred from client computers to server computers and from server computers to client computers. In many cases, the communications between computer systems is commonly viewed from the relatively high level of an application program which uses an application-layer protocol for information transfer. However, the application-layer protocol is implemented on top of additional layers, including a transport layer, Internet layer, and link layer. These layers are commonly implemented at different levels within computer systems. Each layer is associated with a protocol for data transfer between corresponding layers of computer systems. These layers of protocols are commonly referred to as a "protocol stack." In FIG. 13, a representation of a common protocol stack 1330 is shown below the interconnected server and client computers 1304 and 1302. The layers are associated with layer numbers, such as layer number "1" 1332 associated with the application layer 1334. These same layer numbers are used in the depiction of the interconnection of the client computer 1302 with the server computer 1304, such as layer number "1" 1332 associated with a horizontal dashed line 1336 that represents interconnection of the application layer 1312 of the client computer with the applications/services layer 1314 of the server computer through an application-layer protocol. A dashed line 1336 represents interconnection via the application-layer protocol in FIG. 13, because this interconnection is logical, rather than physical. Dashed-line 1338 represents the logical interconnection of the operating-system layers of the client and server computers via a transport layer. Dashed line 1340 represents the logical interconnection of the operating systems of the two computer systems via an Internet-layer protocol. Finally, links 1306 and 1308 and cloud 1310 together represent the physical communications media and components that physically transfer data from the client computer to the server computer and from the server computer to the client computer. These physical communications components and media transfer data according to a link-layer protocol. In FIG. 13, a second table 1342 is aligned with the table 1330 that illustrates the protocol stack includes example protocols that may be used for each of the different protocol layers. The hypertext transfer protocol ("HTTP") may be used as the application-layer protocol 1344, the transmission control protocol ("TCP") 1346 may be used as the transport-layer protocol, the Internet protocol 1348 ("IP") may be used as the Internet-layer protocol, and, in the case of a computer system interconnected through a local Ethernet to the Internet, the Ethernet/IEEE 802.3u protocol 1350 may be used for transmitting and receiving information from the computer system to the complex communications components of the Internet. Within cloud 1310, which represents the Internet, many additional types of protocols may be used for transferring the data between the client computer and server computer.

Consider the sending of a message, via the HTTP protocol, from the client computer to the server computer. An application program generally makes a system call to the operating system and includes, in the system call, an indication of the recipient to whom the data is to be sent as well as a reference to a buffer that contains the data. The data and other information are packaged together into one or more HTTP datagrams, such as datagram 1352. The datagram may generally include a header 1354 as well as the data 1356, encoded as a sequence of bytes within a block of memory. The header 1354 is generally a record composed of multiple byte-encoded fields. The call by the application program to an application-layer system call is represented in FIG. 13 by solid vertical arrow 1358. The operating system employs a transport-layer protocol, such as TCP, to transfer one or more application-layer datagrams that together represent an application-layer message. In general, when the application-layer message exceeds some threshold number of bytes, the message is sent as two or more transport-layer messages. Each of the transport-layer messages 1360 includes a transport-layer-message header 1362 and an application-layer datagram 1352. The transport-layer header includes, among other things, sequence numbers that allow a series of application-layer datagrams to be reassembled into a single application-layer message. The transport-layer protocol is responsible for end-to-end message transfer independent of the underlying network and other communications subsystems, and is additionally concerned with error control, segmentation, as discussed above, flow control, congestion control, application addressing, and other aspects of reliable end-to-end message transfer. The transport-layer datagrams are then forwarded to the Internet layer via system calls within the operating system and are embedded within Internet-layer datagrams 1364, each including an Internet-layer header 1366 and a transport-layer datagram. The Internet layer of the protocol stack is concerned with sending datagrams across the potentially many different communications media and subsystems that together comprise the Internet. This involves routing of messages through the complex communications systems to the intended destination. The Internet layer is concerned with assigning unique addresses, known as "IP addresses," to both the sending computer and the destination computer for a message and routing the message through the Internet to the destination computer. Internet-layer datagrams are finally transferred, by the operating system, to communications hardware, such as a NIC, which embeds the Internet-layer datagram 1364 into a link-layer datagram 1370 that includes a link-layer header 1372 and generally includes a number of additional bytes 1374 appended to the end of the Internet-layer datagram. The link-layer header includes collision-control and error-control information as well as local-network addresses. The link-layer packet or datagram 1370 is a sequence of bytes that includes information introduced by each of the layers of the protocol stack as well as the actual data that is transferred from the source computer to the destination computer according to the application-layer protocol.

Figure 14:
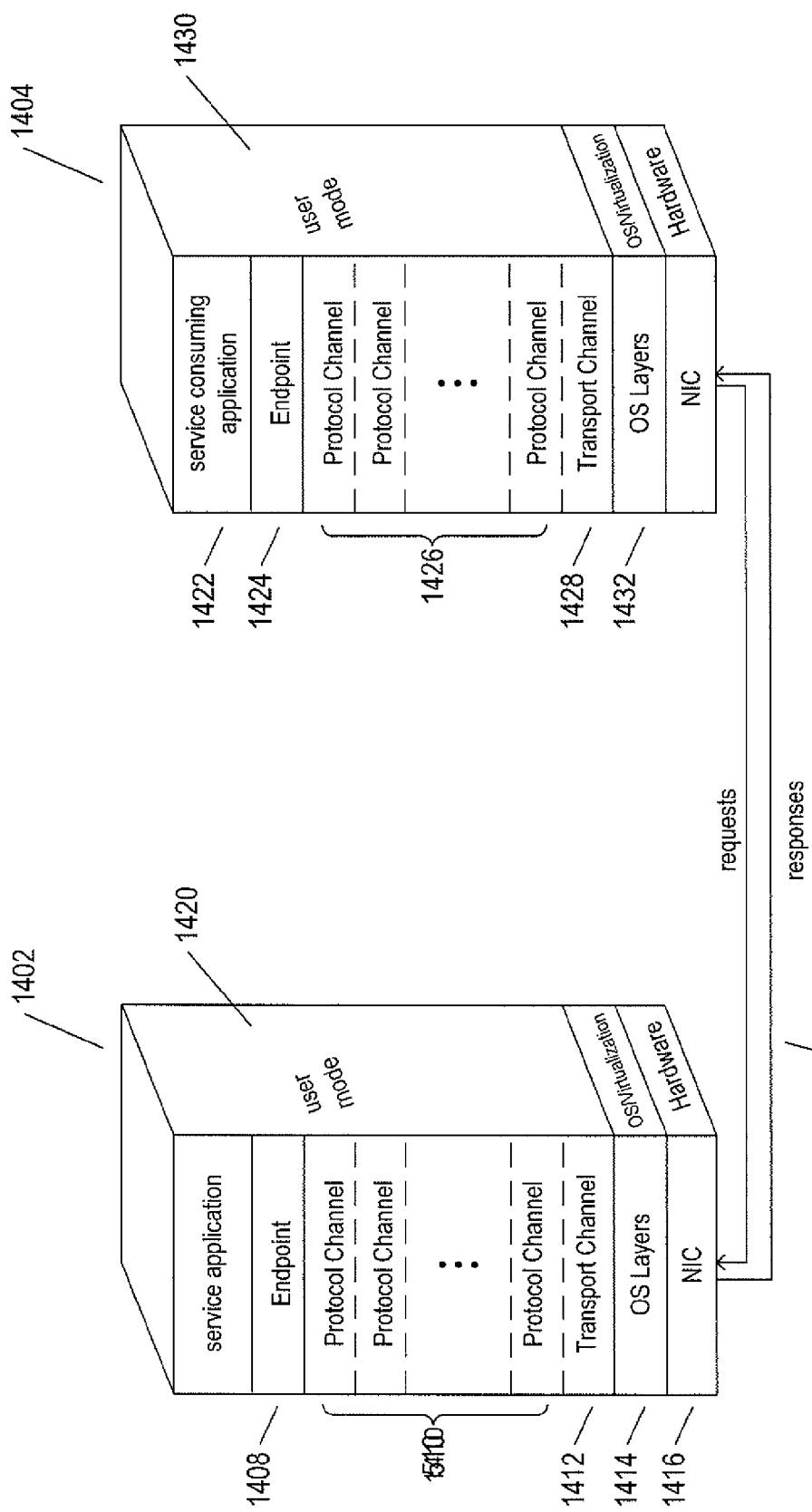
FIG. 14 illustrates another model for network communications used to interconnect consumers of services with service-providing applications running within server computers.

FIG. 14 illustrates another model for network communications used to interconnect consumers of services with service-providing applications running within server computers. The Windows Communication Foundation ("WCF") model for network communications used to interconnect consumers of services with service-providing applications running within server computers. In FIG. 14, a server computer 1402 is shown to be interconnected with a service-consuming application running on a user computer 1404 via communications stacks of the WCF that exchange data through a physical communications medium or media 1406. As shown in FIG. 14, the communications are based on the client/server model in which the service-consuming application transmits requests to the service application running on the service computer and the service application transmits responses to those requests back to the service-consuming application. The communications stack on the server computer includes an endpoint 1408, a number of protocol channels 1410, a transport channel 1412, various lower-level layers implemented in an operating system or both in an operating system and a virtualization layer 1414, and the hardware NIC peripheral device 1416. Similar layers reside within the user computer 1404. As also indicated in FIG. 14, the endpoint, protocol channels, and transport channel all execute in user mode, along with the service application 1420 within the server computer 1402 and, on the user computer, the service-consuming application 1422, endpoint 1424, protocol channels 1426, and transport channel 1428 also execute in user mode 1430. The OS layers 1414 and 1432 execute either in an operating system or in a guest operating system and underlying virtualization layer.

An endpoint (1408 and 1424) encapsulates the information and logic needed by a service application to receive requests from service consumers and respond to those requests, on the server side, and encapsulate the information and logic needed by a client to transmit requests to a remote service application and receive responses to those requests. Endpoints can be defined either programmatically or in Extensible Markup Language ("XML") configuration files. An endpoint logically consists of an address represented by an endpoint address class containing a universal resource identifier ("URI") property and an authentication property, a service contract, and a binding that specifies the identities and orders of various protocol channels and the transport channel within the communications stack underlying the endpoint and overlying the various lower, operating-system- or guest-operating-system layers and the NIC hardware. The contract specifies a set of operations or methods supported by the endpoint. The data type of each parameter or return value in the methods associated with an endpoint are associated with a data-contract attribute that specifies how the data type is serialized and deserialized. Each protocol channel represents one or more protocols applied to a message or packet to achieve one of various different types of goals, including security of data within the message, reliability of message transmission and delivery, message formatting, and other such goals. The transport channel is concerned with transmission of data streams or datagrams through remote computers, and may include error detection and correction, flow control, congestion control, and other such aspects of data transmission. Well-known transport protocols include the hypertext transport protocol ("HTTP"), the transmission control protocol ("TCP"), the user datagram protocol ("UDP"), and the simple network management protocol ("SNMP"). In general, lower-level communications tasks, including Internet-protocol addressing and routing, are carried out within the operating-system- or operating-system-and-virtualization layers 1414 and 1432.

The Open Systems Interconnection ("OSI") model is often used to describe network communications. The OSI model includes seven different layers, including: (1) a physical layer, L1, that describes a physical communications component, including a communications medium and characteristics of the signal transmitted through the medium; (2) a data-link layer, L2, that describes datagram exchange over the L1 layer and physical address; (3) a network layer, L3, that describes packet and datagram exchange through the L2 layer, including oath determination and logical addressing; (4) a transport layer, L4, that describes end-to-end connection of two communicating entities, reliability, and flow control; (5) a sessions layer, L5, that describes management of sessions, or multi-packet data transmission contexts; (6) a presentation layer, L6, that describes data representation, data encryption, and machine-independent data; and an application layer, L7, that describes the interconnection of applications, including client and server applications.

Figure 15:
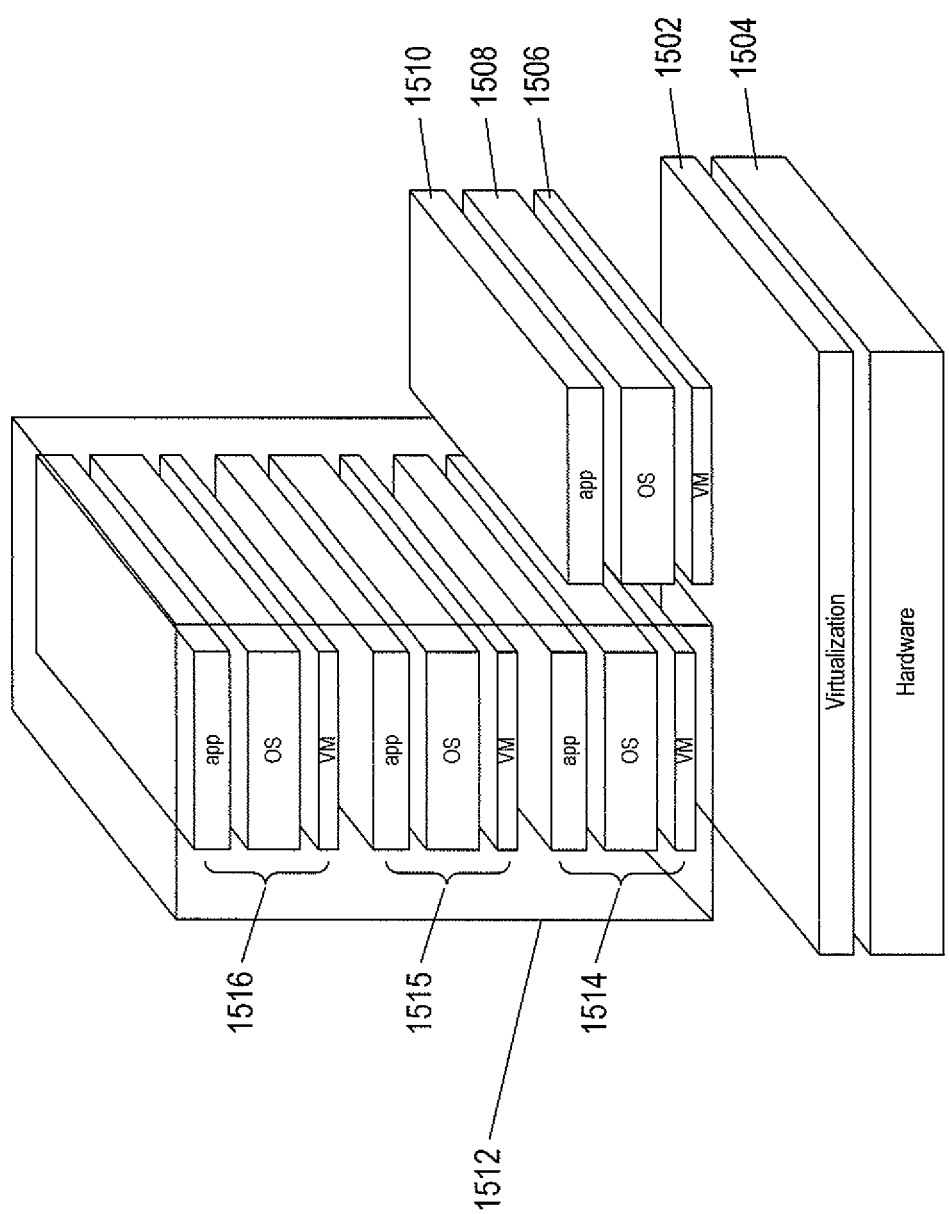
FIG. 15 illustrates a virtual application.

FIG. 15 illustrates a virtual application. As discussed above, virtualization can be viewed as a layer 1502 above the hardware layer 1504 of a computer system that supports execution of a virtual machine layer 1506, in turn supporting execution of an operating system 1508 and one or more application programs 1510 executing in an execution environment provided by the operating system, virtual machine, virtualization layer, and hardware. Another abstraction provided by a virtualization layer is a virtual application or vApp. A vApp 1512 is a resource container that includes one or more virtual machines that are grouped together to form an application. In the example shown in FIG. 15, vApp 1512 includes three different virtual-machine/OS/application entities 1514-1516. These three different entities may include, as one example, a web front end server and two database servers. The computational entities within a vApp can be easily deployed and started up and shut down, in similar fashion to the deployment, starting up, and shutting down of individual virtual machines. The vApp also provides an additional layer of abstraction within a virtualized computing environment that may be associated with a vApp-specific security layer to allow securing of groups of virtual machines under a common security scheme.

Figure 16:
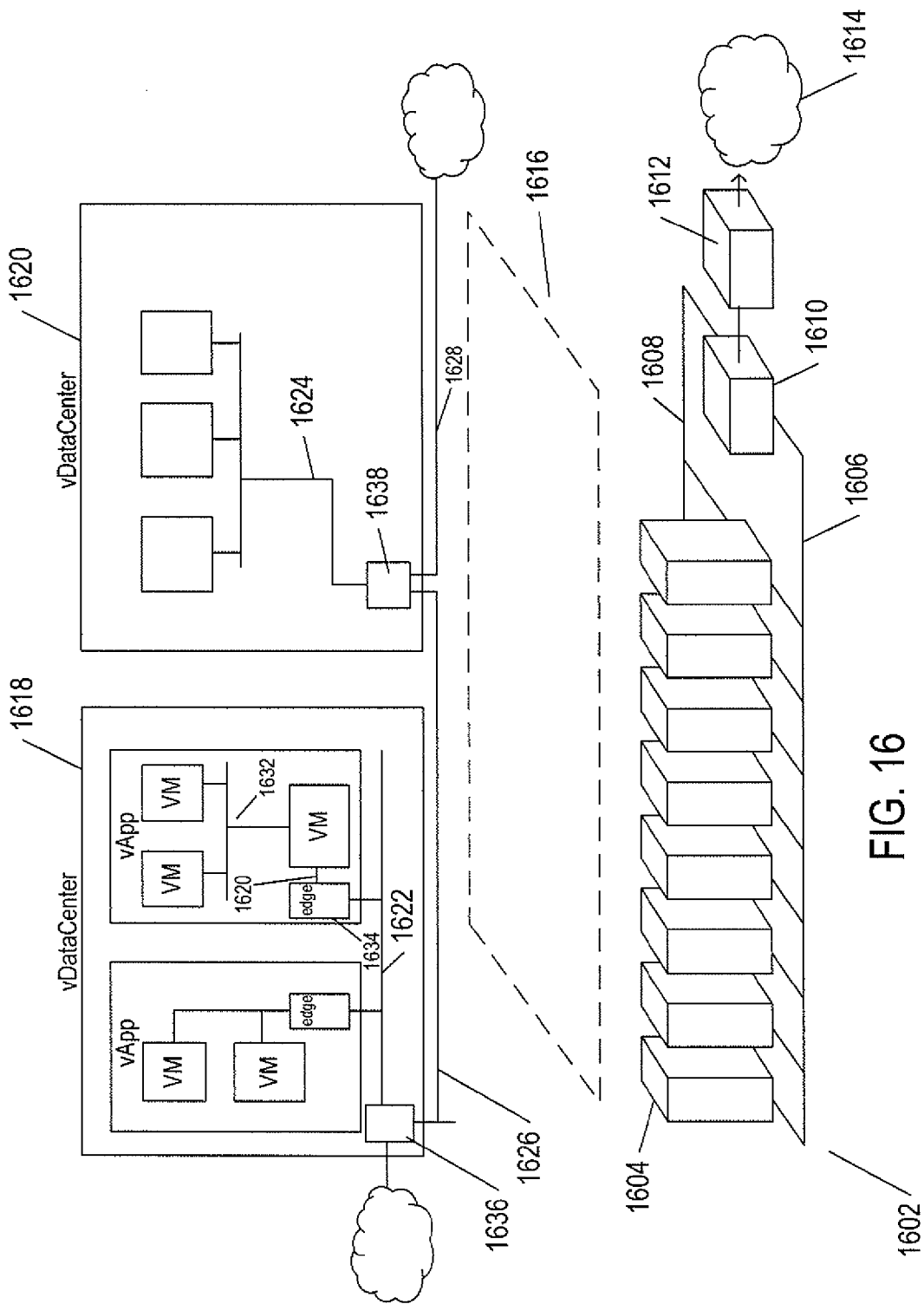
FIG. 16 illustrates virtualization of networking facilities within a physical data center.

Just as physical data-storage devices and physical servers are virtualized by a virtualization layer, the networking resources within a physical data center are also virtualized by a virtualization layer to provide various types of virtualized networking facilities. FIG. 16 illustrates virtualization of networking facilities within a physical data center. As shown in FIG. 16, a physical data center 1602 may include a large number of enclosures containing multiple servers, such as enclosure 1604, and network-attached data-storage subsystems linked together by several local-area networks 1606 and 1608 interconnected through bridging, switching, firewall, and load-balancing appliances 1610 connected to a VPN gateway appliance 1612 through which the physical data center is interconnected with the Internet 1614 and other wide-area networks. The virtualization layer 1616, as discussed above, creates multiple virtual data centers 1618 and 1620 that execute within the physical data center, each having one or more internal organization networks 1622 and 1624 that allow intercommunication between virtual machines and vApps executing within the data centers and that may also provide interconnection with remote computational entities via virtual external networks 1626 and 1628 that interconnect the internal organization virtual networks 1622 and 1624 with the Internet and other wide-area networks. In addition, there may be internal networks, including networks 1630 and 1632, within individual vApps. Isolated virtual internal vApp networks, such as internal virtual network 1632, allow the virtual machines within a vApp to intercommunicate while other types of virtual internal networks, including routed virtual internal networks, such as virtual network 1632, provide connectivity between one or more virtual machines executing within the vApp to other virtual machines executing within a given virtual data center as well as remote machines via the virtual organization network 1632 and virtual external network 1626. The virtual internal routed network 1630 is associated with an edge virtual appliance 1634 that runs as a virtual machine within the virtual datacenter. The edge appliance provides a firewall, isolation of the subnetwork within the vApp from the organization of virtual network 1622 and other networks to which it is connected, and a variety of networking services, including virtual private network connections to other edge appliances, network address translation to allow virtual machines within the vApp to intercommunicate with remote computational entities, and dynamic host configuration protocol facilities ("DHCP"). Virtual private networks employ encryption and other techniques to create an isolated, virtual network interconnecting two or more computational entities within one or more communications networks, including local area networks and wide-area networks, such as the Internet. One type of VPN is based on the secure sockets layer and is referred to as the secure socket layer virtual private network ("SSL VPN"). Another type of VPN is referred to as an Internet-protocol-security VPN ("IPsec").

In general, an edge appliance isolates an interior subnetwork, on one side of the edge appliance, from an exterior network, such as the Internet. Computational entities, such as virtual machines, within the interior subnetwork can use local network addresses that are mapped, by the edge appliance, to global Internet addresses in order to provide connectivity between the edge appliance and computational entities within the interior subnetwork to remote computer systems. An edge appliance essentially multiplex a small number of global network addresses among the computational entities within the subnetwork, in many cases using pools of port numbers distributed within the internal subnetwork. Just as edge appliance 1634 provides gateway services and isolation to the computational entities interconnected by a virtual routed interior network 1630 within a vApp, additional edge appliances 1636 and 1638 may provide similar gateway services to all the computational entities interconnected by an organization virtual network 1622 and 1624 within virtual data centers 1618 and 1620, respectively.

The Stretch-Deploy Operation

Figure 17A:
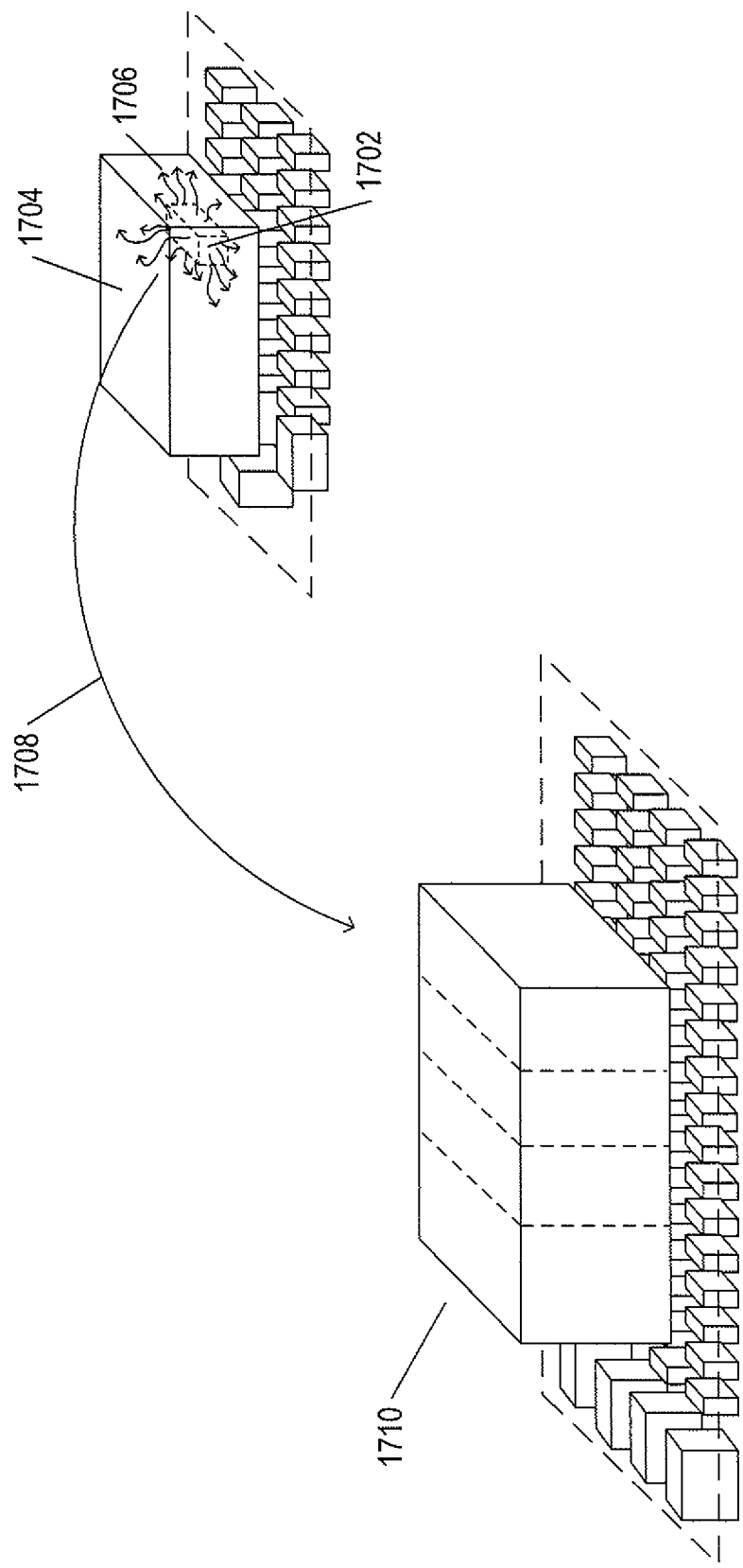
FIGS. 17A-B illustrate one approach to moving a virtual machine, executing within a first cloud-computing facility, to a second cloud-computing facility.
Figure 17B:
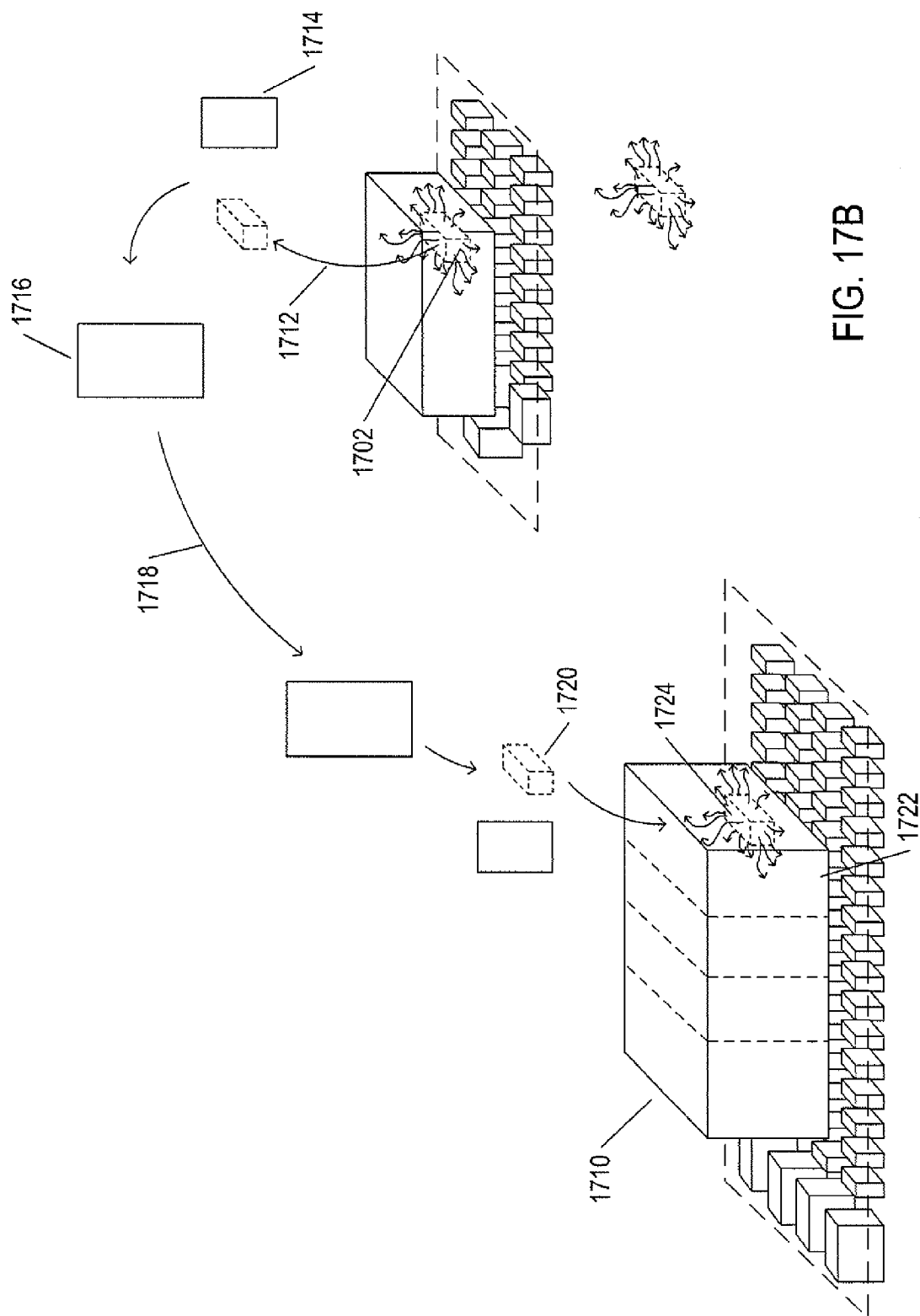

FIGS. 17A-B illustrate one approach to moving a virtual machine, executing within a first cloud-computing facility, to a second cloud-computing facility. In FIG. 17A, the virtual machine or vApp 1702 is represented as a small rectangular volume within a larger rectangular volume 1704 representing a first virtual data center. In the example shown in FIG. 17A, the first virtual data center 1704 represents a private cloud-computing facility. The small arrows, such as arrow 1706, emanating from the representation of the virtual machine or vApp 1702 represent the interconnections between the virtual machine or vApp and other virtual machines, vApps, and applications, both remote and local, via virtual and physical networks. As represented by the large curved arrow 1708, a cloud-computing-facility user may wish to move a virtual machine or vApp 1702 to a different, second cloud-computing facility 1710, such as a multi-tenant, public cloud-computing facility.

FIG. 17B illustrates a currently employed method for moving a virtual machine or vApp from a private cloud to a public cloud. As shown in FIG. 17B, the virtual machine or vApp 1702 is first powered down 1712, with the powered-down virtual machine or vApp essentially stored as data 1714 within the virtual data center. The vApp or virtual machine and is then encapsulated within an OVF 1716 which is exported from the first cloud-computing facility 1718 to the second cloud-computing facility, where the OVF is imported to create a corresponding virtual machine or vApp 1720 within a virtual data center 1722 of the second cloud-computing environment 1710. Finally, the corresponding virtual machine or vApp is reconfigured and restarted 1724.

Reconfiguration of the corresponding virtual machine or vApp generally involves association of new global and local network addresses with the vApp or VM and reconnection of the vApp or VM with remote computational entities. For example, translation of domain names associated with services executing within the vApp or VM within DNS servers is reconfigured, addresses associated with virtual network interface controllers within the vApp or VM are configured, and various types of security layers, Firewall, and NAT rules are re-established for the vApp or VM. In currently available virtualization facilities, this type of reconfiguration may involve significant time and manual interaction of administration users with administration interfaces provided by the cloud-computing facility. This may, in turn, result in significant interruption in the service provided by an application executing within the vApp or VM to remote clients.

Figure 18A:
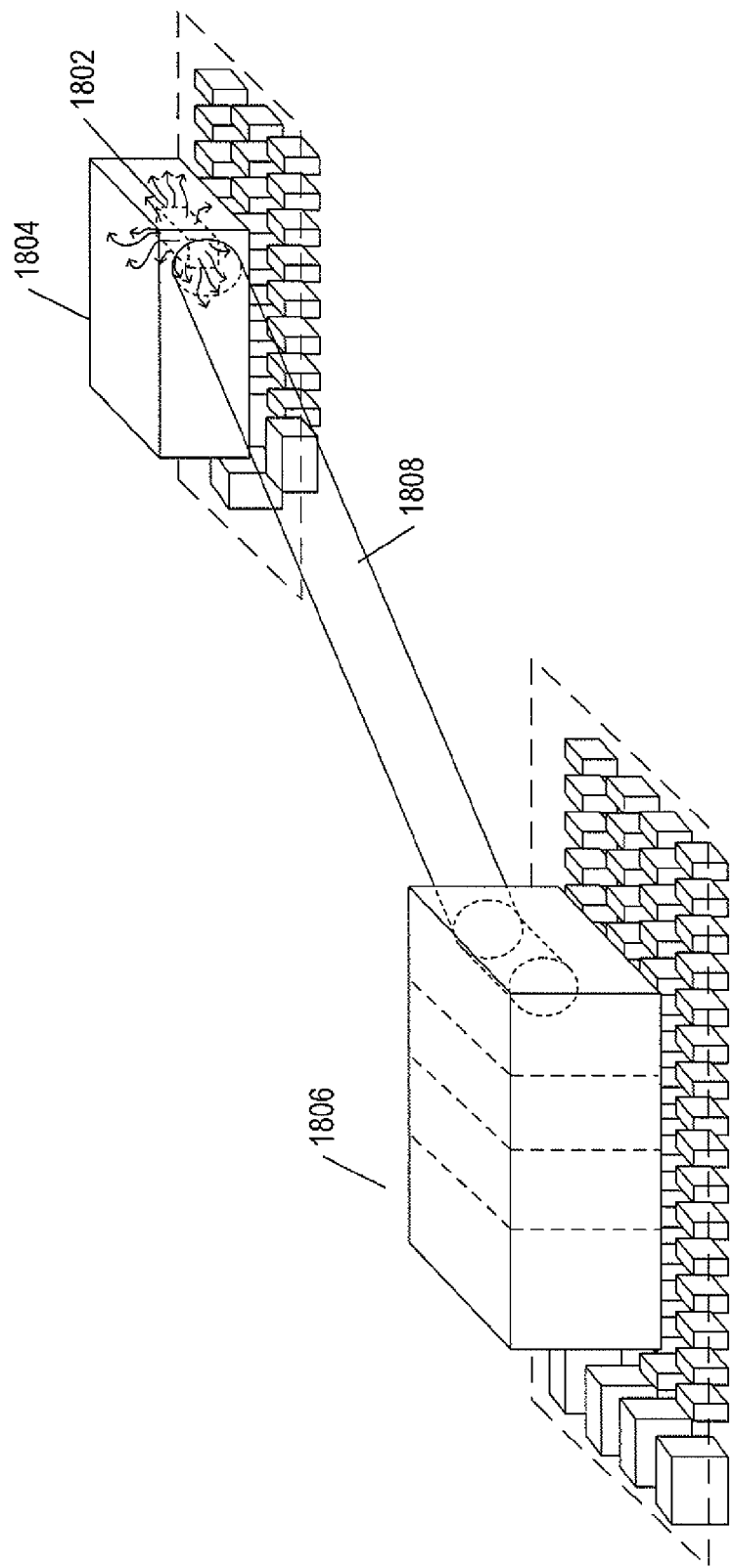
FIGS. 18A-C illustrate the stretch-deploy operation disclosed in the current document.
Figure 18B:
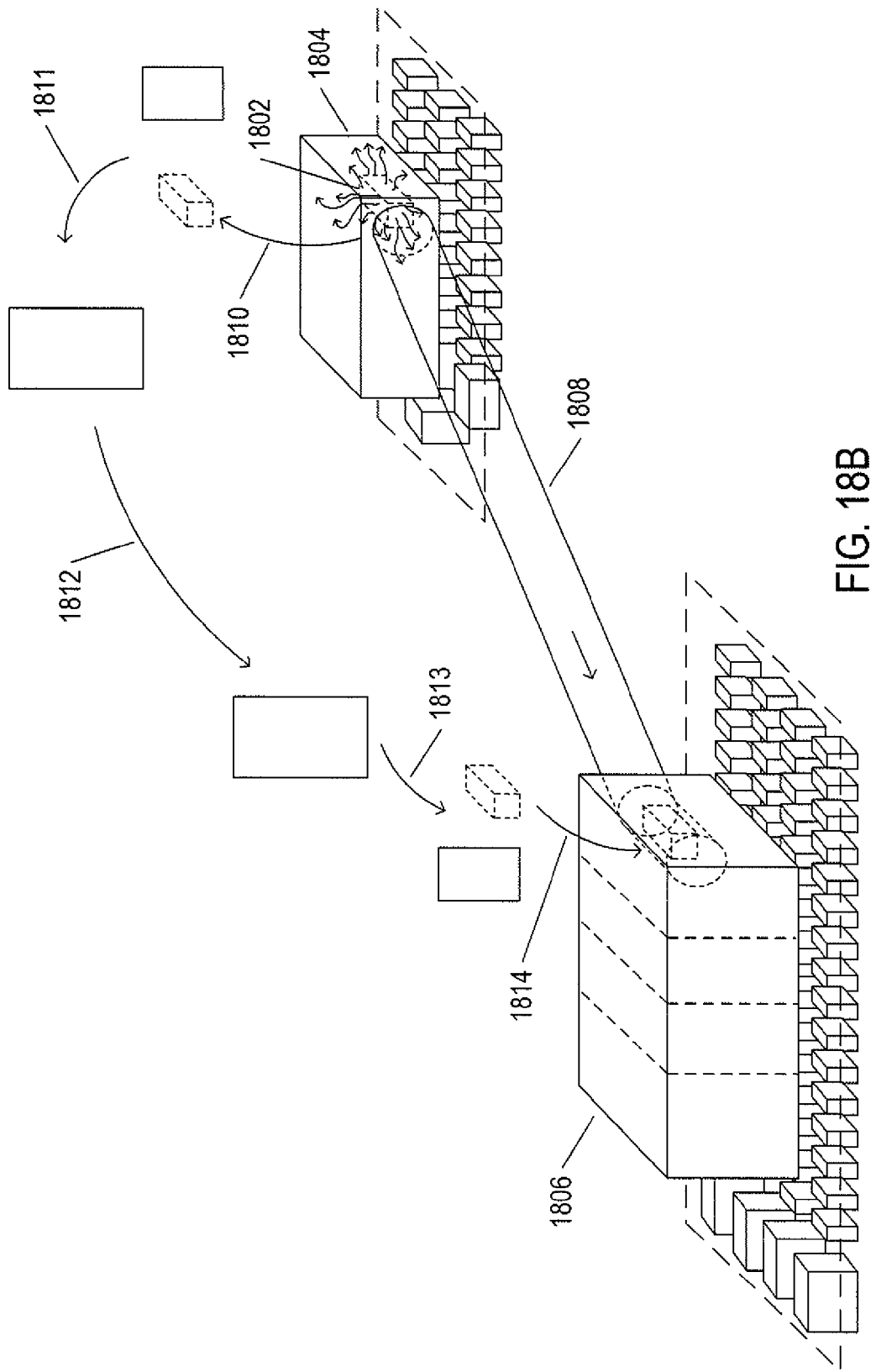
Figure 18C:
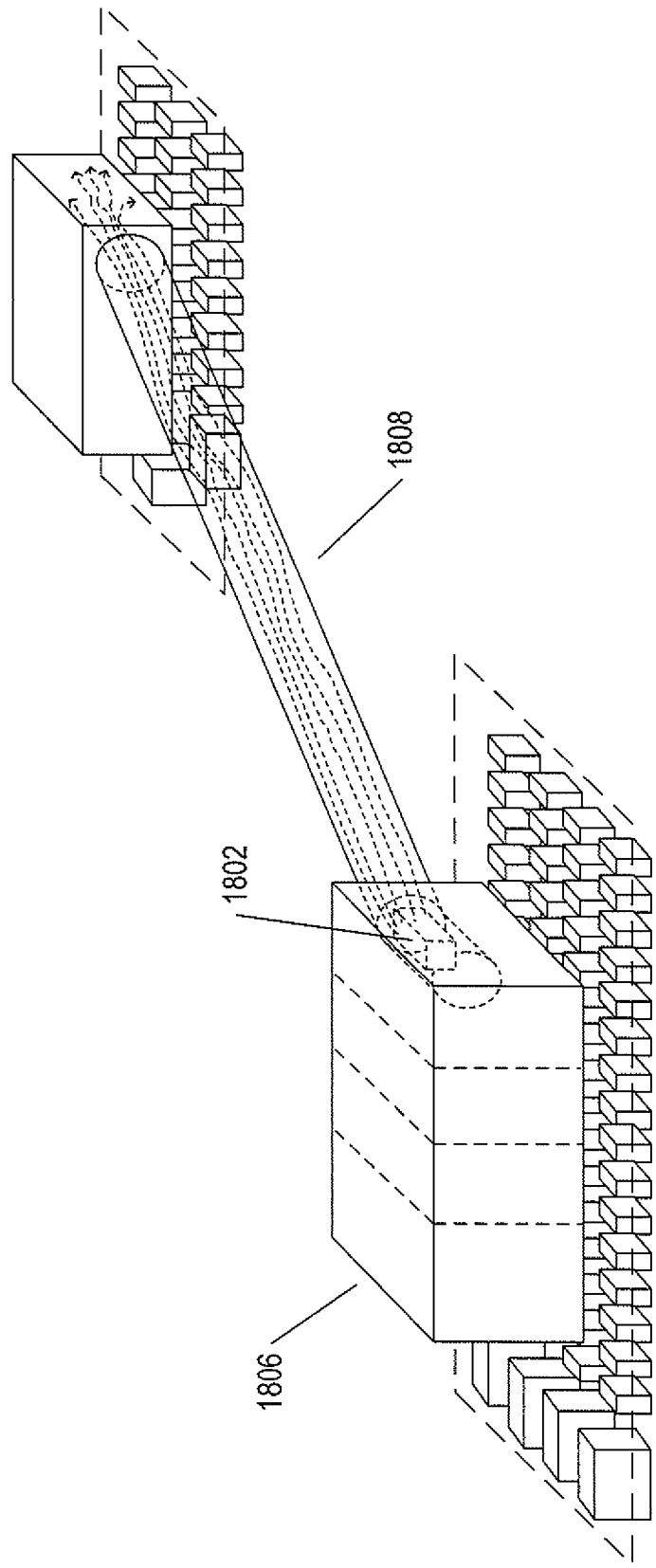

FIGS. 18A-C illustrate the stretch-deploy operation disclosed in the current document. FIGS. 18A-C use the same illustration conventions used in FIGS. 17A-B. In the stretch-deploy operation, used to move a virtual machine or vApp 1802 from a first cloud-computing facility 1804 to a second cloud-computing facility 1806, a secure virtual private network tunnel 1808 is first established between the first cloud-computing facility 1804 and the second cloud-computing facility 1806. This secure SSL-VPN tunnel 1808 essentially extends, between two organization edge appliances, an internal virtual network within the first cloud-computing facility to the second cloud-computing facility. Next, as shown in FIG. 18B, the virtual machine or vApp 1802 is moved 1810-1814, through a first VCC node of the first cloud-computing facility and a second VCC node of the second cloud-computing facility, from the first cloud-computing facility to the second VCC node of the second cloud-computing facility. Finally, as shown in FIG. 18C, the virtual machine or vApp is deployed, and execution of the virtual machine or vApp is restarted within the second cloud-computing facility 1806 but within the networking context of the extended internal network 1808 via the secure SSL-VPN link between the first cloud-computing facility and the second cloud-computing facility. The secure SSL-VPN essentially extends an internal L2 virtual local network from the first cloud-computing facility to the second cloud-computing facility. The broadcast, unicast and multicast traffic carried by the virtual local network in the first cloud-computing facility 1804 is seen on the second cloud-computing facility 1806 via the stretched VPN tunnel. Network traffic from remote computer systems is first received by the first cloud-computing facility and then transferred, through the secure VPN, to the second cloud-computing facility, reaching the migrated virtual machine or vApp through internal virtual networks within the second cloud-computing facility. Communications messages transmitted by the moved or migrated virtual machine or vApp to remote computers traverse various internal virtual networks within the second cloud-computing facility and are transferred through the secure VPN tunnel 1808 back to the first cloud-computing facility, from which the messages may either be directed to local computational entities within the first cloud-computing facility through internal virtual networks of the first cloud-computing facility or may be transmitted out to the Internet or other wide-area networks by the first cloud-computing facility. In essence, the stretch-deploy operation introduces an additional hop, through the secure VPN tunnel, and a communications overhead associated with that additional hop. However, the migrated virtual machine or vApp can be restarted within the second cloud-computing facility without extensive and lengthy network and operating-system reconfiguration and therefore resumes execution using the same network addresses that were used in the first cloud-computing facility. The internal network configuration of the virtual machine or vApp remains largely unchanged, and the external networking interface to the virtual machine or vApp also remains unchanged. Although the virtual machine or vApp is physically executed using execution cycles provided by the second cloud-computing facility, the virtual machine or vApp is logically located, with respect to networking connectivity, in a kind of virtual extension of the internal virtual networks of the first cloud-computing facility.

FIGS. 19A-I illustrate the stretch-deploy operation as implemented in one type of virtualization layer. FIGS. 19A-I all use the same illustration conventions, next discussed with reference to FIG. 19A.

Figure 19A:
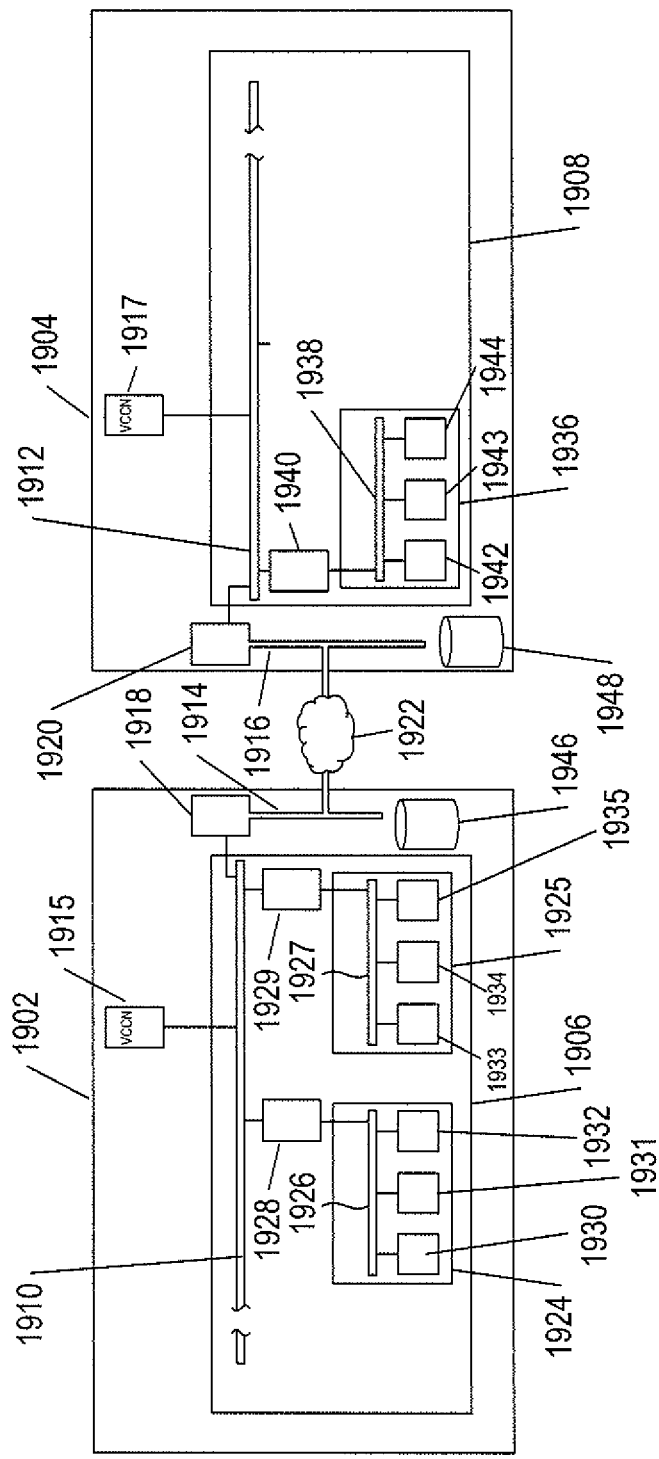
FIGS. 19A-I illustrate the stretch-deploy operation as implemented in one type of virtualization layer.

FIG. 19A shows an organization virtual data center in a first cloud-computing facility 1902 and an organizational virtual data center in a second cloud-computing facility 1904. For the example of FIGS. 19A-G, the same organization controls both virtual data centers. The stretch-deploy operation can be used to move a virtual machine or vApp from a private cloud to a public cloud or from a public cloud to a different public cloud, in this particular implementation, and is provided as a cloud-connector functionality. The first public cloud 1902 is referred to as the "source cloud," and the second public cloud 1904 is referred to as the "target cloud." Relatively minor adjustments can be made to the implementation in order to allow movement of VMs and vApps from a variety of different types of source clouds to a variety of different types of target clouds. The source cloud 1902 includes virtual data center ("VDC") 1906 and the target cloud 1904 includes VDC 1908. Each VDC includes a virtual organization network 1910 and 1912, respectively. Each virtualization organization network interconnects to a virtual external network 1914 and 1916, respectively, through an organization edge appliance 1918 and 1920, respectively. Each VDC also includes a VCC node, 1915 and 1917, respectively. The virtual external networks are implemented within one or more physical networks that provide interconnection of the external networks through the Internet 1922. VDC 1906 within the source cloud includes at least two vApps 1924 and 1925, each with an internal virtual routed vApp network 1926 and 1927 that interconnects with the virtual organization network 1910 through an edge appliance 1928 and 1929 associated with a vApp 1924 and 1925. The vApps include numerous virtual machines 1930-1935, the first of which 1930 is intended to be moved, using the stretch-deploy operation, to the target cloud 1904. VDC 1908 within the destination cloud includes a vApp 1936 with an internal virtual routed vApp network 1938 that interconnects with the virtual organization network 1912 through an edge appliance 1940 associated with vApp 1936. The vApp 1936 includes numerous virtual machines 1942-1944. The VDC 1906 in the source cloud and the VDC 1908 in the target cloud each includes a catalog facility 1946 and 1948, respectively, that allows the organization to publish vApp templates and VM templates for access by VDCs in remote clouds. These templates can be used to quickly instantiate virtual machines and vApps on various different cloud-computing facilities.

An initial set of tasks carried out by the stretch-deploy operation is directed to ensuring that the source VM or vApp that is to be moved from the source cloud to the target cloud and the VDC with the source cloud and VDC within the target cloud are all capable of participating in a stretch-deploy operation. Depending on the stretch-deploy implementation, there may be numerous constraints that need to be satisfied before the stretch-deploy operation can be undertaken. As one example, in certain implementations, licensing requirements for virtualization-layer components must be satisfied, there must be adequate virtual data-storage capacity in the VDC of the source cloud and VDC of the target cloud, the VM that is to be moved may need to be interconnected, through a routed virtual internal vApp network, to a virtual external network, the vApp edge appliance 1928 may need to be connected to a virtual distributed switch, rather than a physical switch, and the edge appliance may need to support or be configured to provide certain basic services. Additionally, there may be constraints with regard to the number of virtual networks to which the VM or vApp that is to be moved is connected, and these networks may be associated with type and configuration constraints. Similar considerations may apply to the VDC within the target cloud.

Figure 19B:
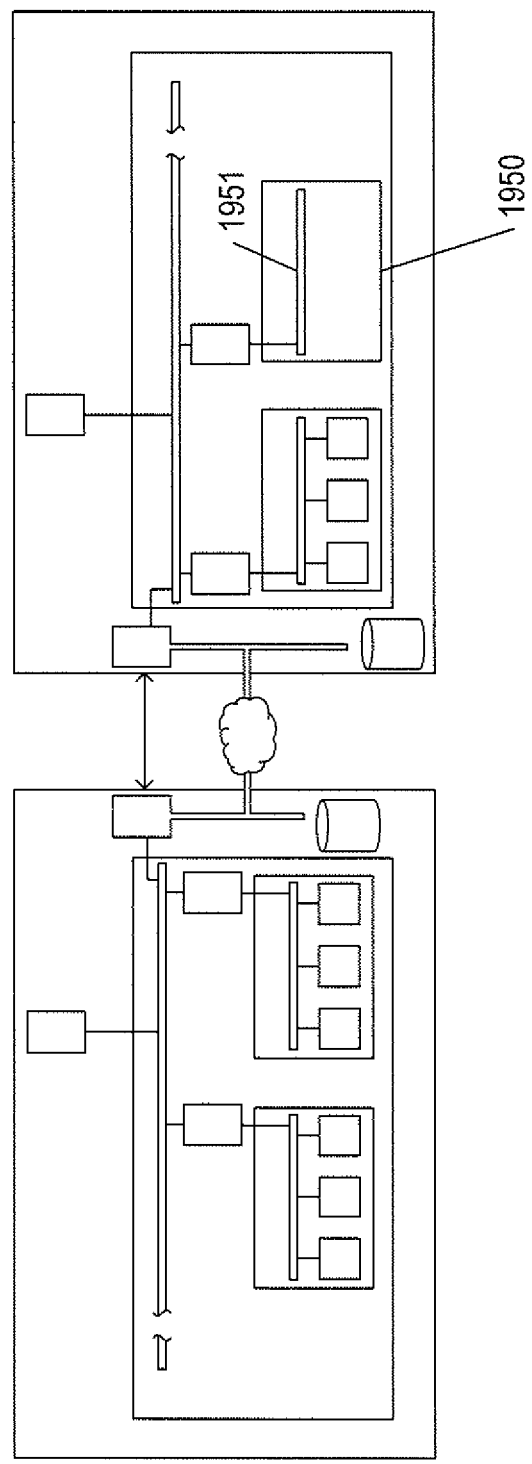
Figure 19C:
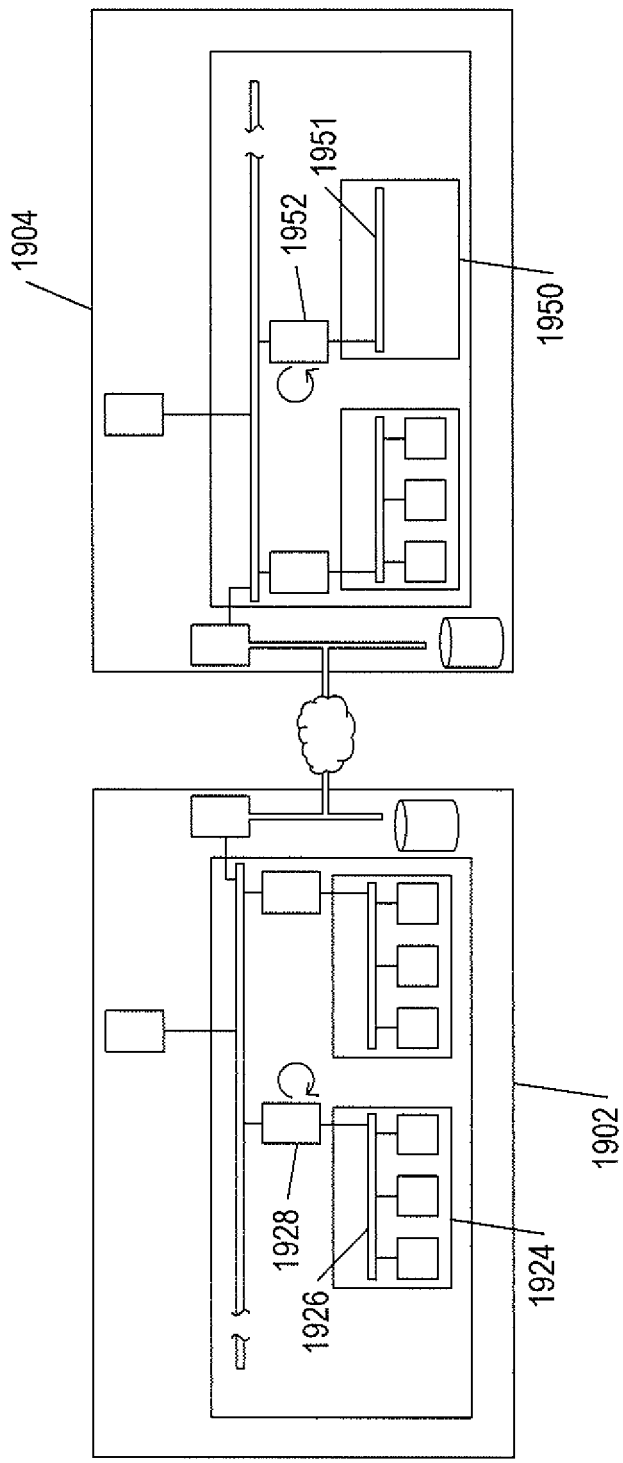
Figure 19D:
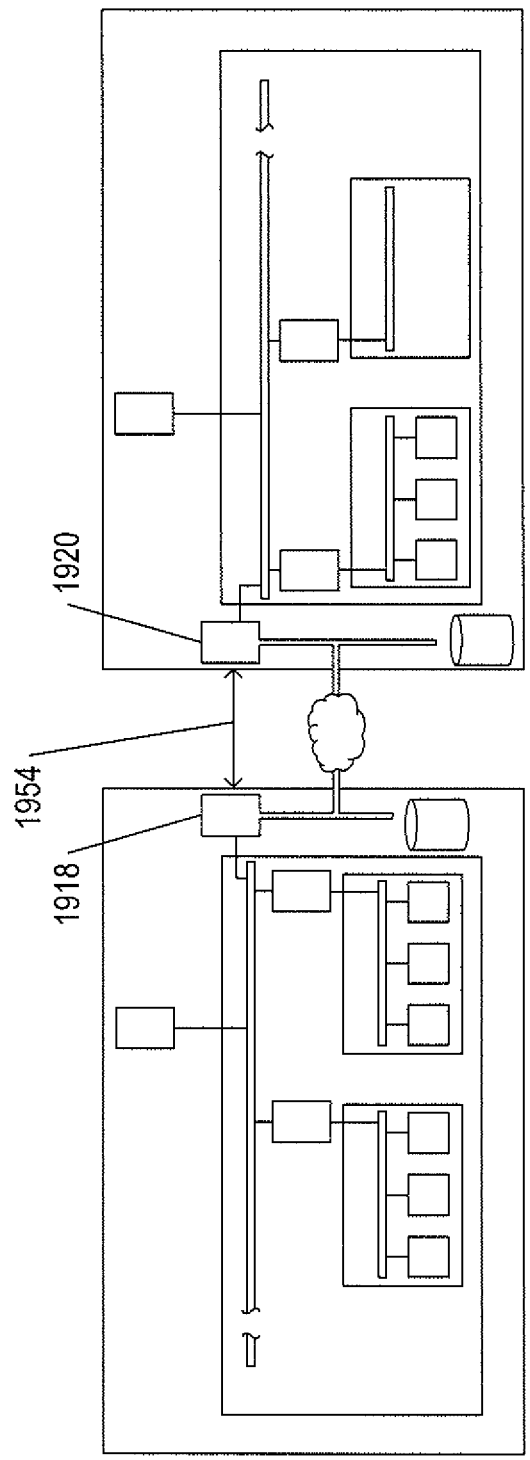

Once the configuration, licensing, storage, and other constraints associated with the stretch-deploy operation have been satisfied, the remaining operations carried out during the stretch-deploy operation are undertaken. FIGS. 19B-D illustrate a first infrastructure phase of the stretch-deploy operation as implemented in one type of virtualization layer. In a first step, illustrated in FIG. 19B, an empty routed vApp 1950 with a virtual internal routed network 1951 is created in the VDC of the target cloud. This vApp is launched in a second step. In a third step, illustrated in FIG. 19C, the edge appliance 1952 associated with the routed internal virtual network 1951 within vApp 1950 is configured with dynamic network-address-translation and firewall rules needed for carrying out the stretch-deploy operation. Similar configuration of the edge appliance 1928 associated with the virtual internal routed network 1926 within the vApp 1924 of the VDC in the source cloud 1902 may be carried out in a fourth step. Finally, as illustrated in FIG. 19D, SSL VPN objects are created in the organization edge appliance 1920 of the target cloud and the organization edge appliance 1918 of the source cloud in order to create an SSL VPN tunnel 1954 between organization edge appliance 1918 and organization edge appliance 1920. In certain cases, the SSL VPN may already exist, in which case the tunnel is not re-created. Organization edge appliances 1918 and 1920 are also configured with dynamic network-address-translation and firewall rules needed for carrying out the stretch-deploy operation. In FIG. 19D, the SSL VPN tunnel 1954 is illustrated as a double-headed arrow directly interconnecting the two edge appliances. However, the SSL VPN tunnel is implemented within the physical networking components of the target cloud and source cloud, with communications messages flowing through the same physical pathways within which the organization networks and organization edge appliances, and virtual external networks are implemented.

Figure 19E:
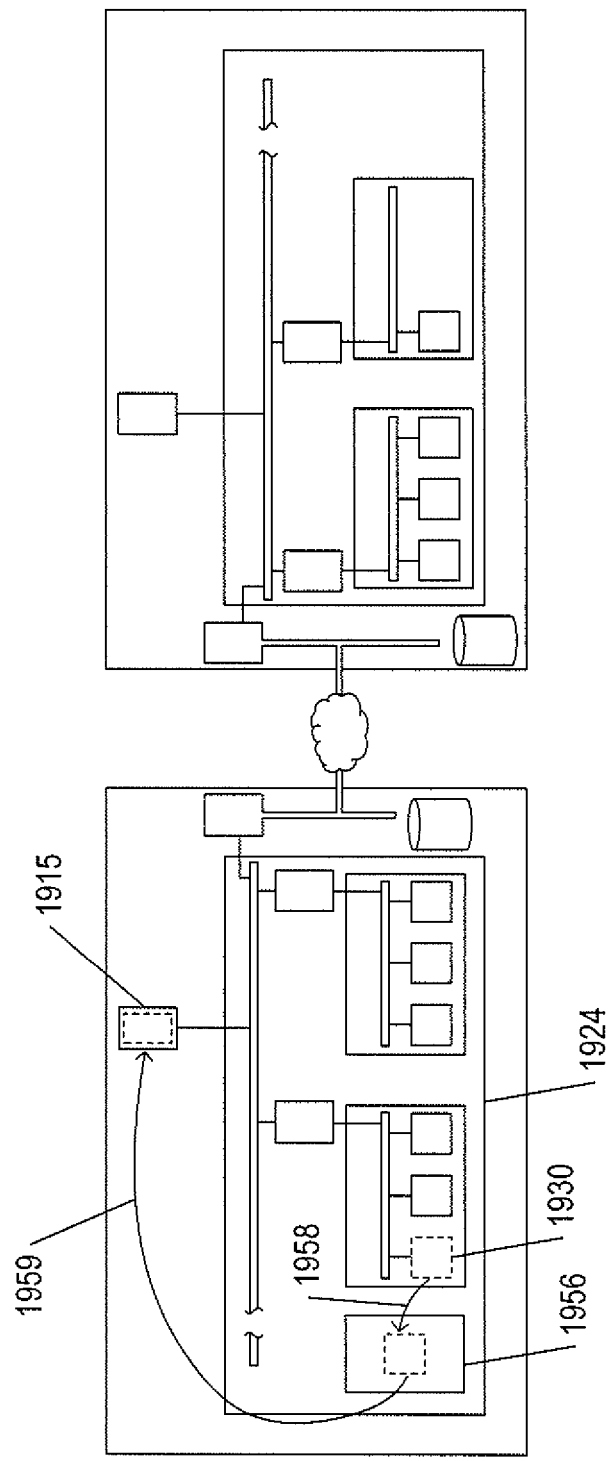
Figure 19F:
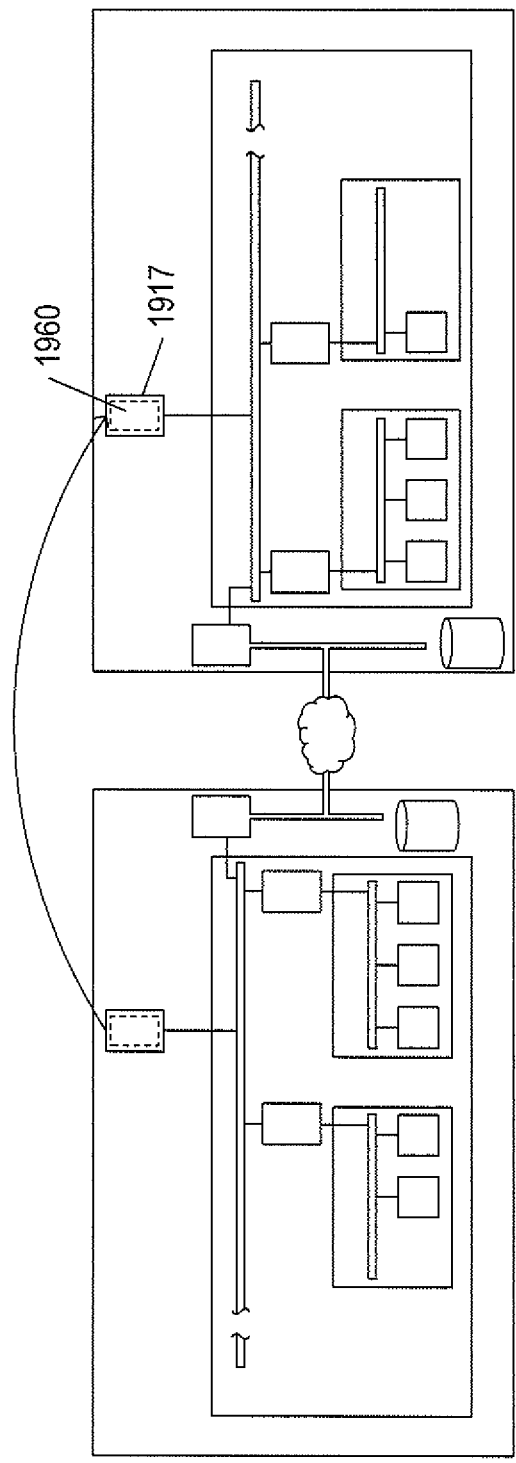

In a next copy phase of the stretch-deploy operation, illustrated in FIGS. 19E-F, a representation of the virtual machine is transferred from the source cloud to the target cloud. As shown in FIG. 19E, a temporary vApp 1956 is first created in the source cloud. The VM 1930 is moved from the original vApp 1924 within VDC 1906 of the source cloud 1902 to the temporary vApp 1956, as represented by curved arrow 1958. In a third step, the temporary vApp with the moved VM 1956 is moved to VCC node 1915 within the source cloud, as indicated by curved arrow 1959. As shown in FIG. 19F, the vApp template is transferred to VCC node 1917 via OVF file 1960.

Figure 19G:
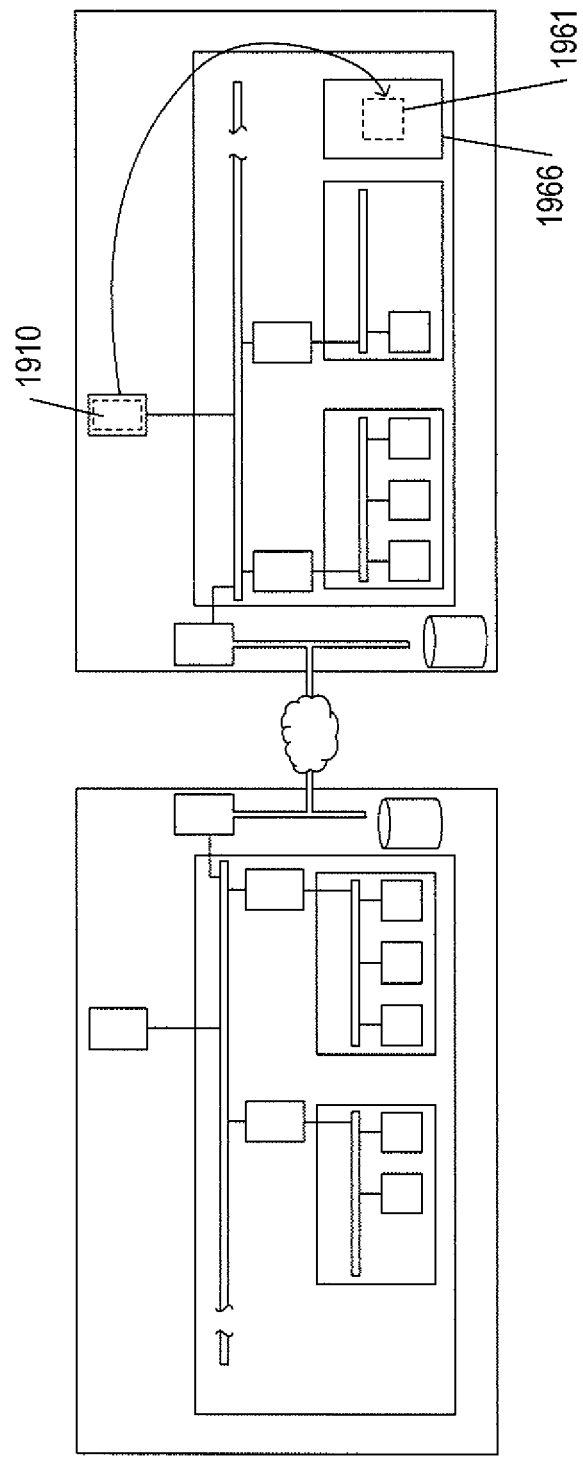
Figure 19H:
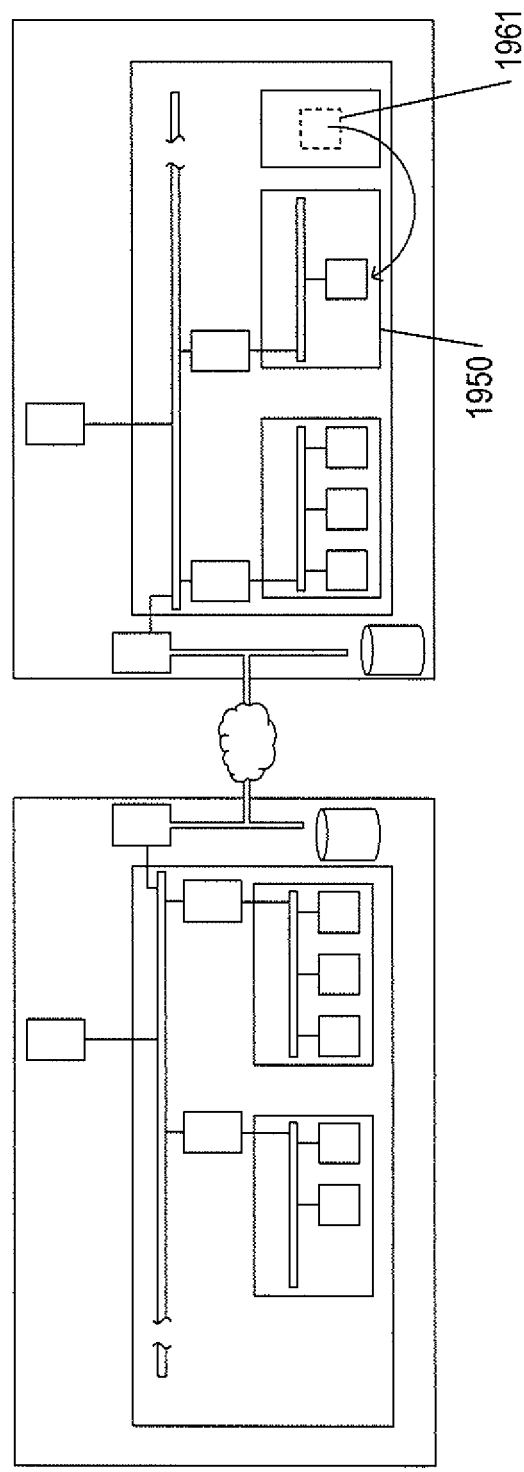
Figure 19I:
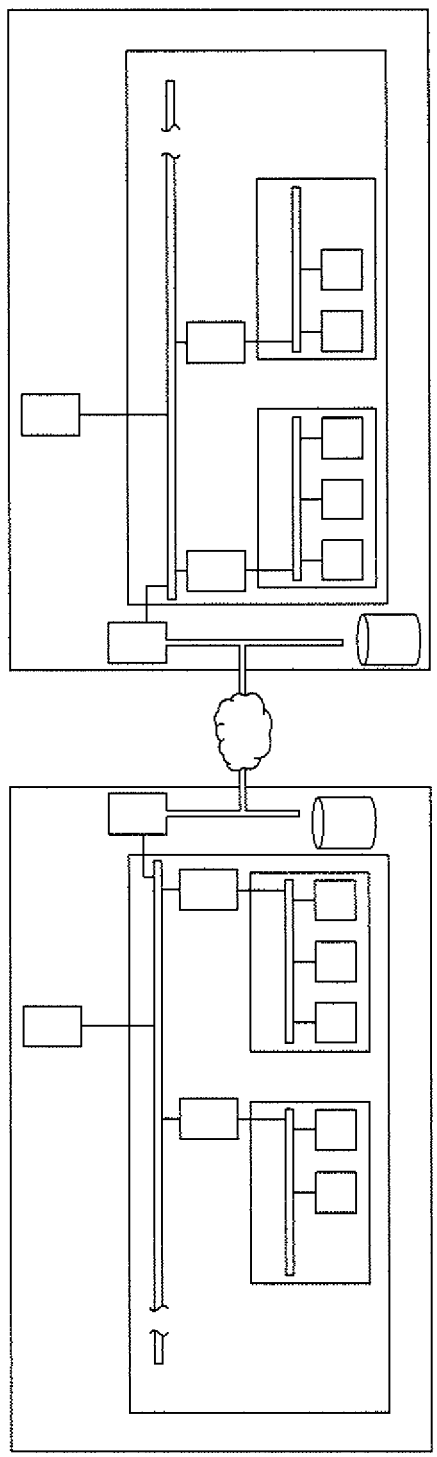

Finally, a deploy phase of the stretch-deploy operation is carried out, as illustrated in FIGS. 19G-I. First, as shown in FIG. 19G, a temporary vApp 1966 is created within the public cloud using the vApp template 1960 that was transferred to VCC node 1917 during the copy phase. This temporary vApp includes the VM 1961 that originally executed as VM 1930 in the source cloud. In a next step, illustrated in FIG. 19H, VM 1961 is moved from the temporary vApp 1966 to the empty routed vApp 1950 created during the infrastructure phase, as discussed above with reference to FIG. 19B. Then, as illustrated in FIG. 19I, the temporary vApp is deleted, the moved VM 1961 is launched, and any additional configuration of the moved VM 1961 is undertaken. Additional settings may be changed for the vApp 1924 in the source cloud that originally contained the moved VM 1961, as well.

Thus, following the stretch-deploy operation, the moved VM 1961 executes within the target cloud 1904, but all communications to and from this VM are transferred through the SSL VPN tunnel 1954, except for the local communication involving the target cloud network. Remote access to the moved VM is therefore directed to the same networking addresses and reaches the same organization edge appliance 1918 in the source cloud, from which the traffic is transferred through the SSL VPN tunnel 1954 to the organization edge appliance 1920 within the target cloud, to which the network traffic was directed when the VM 1930 executed in the source cloud. Similarly, messages transmitted from the moved VM 1961 are routed by virtual edge appliance 1952 to the organization edge appliance 1920, which transmits the messages through the SSL VPN tunnel 1944 to the organization edge appliance 1918 in the source cloud from which they are distributed either outward, to remote computational entities or distributed inward to other VMs 1931 and 1932 that were originally collocated with the moved VM, as shown in FIG. 19A.

Figure 20A:
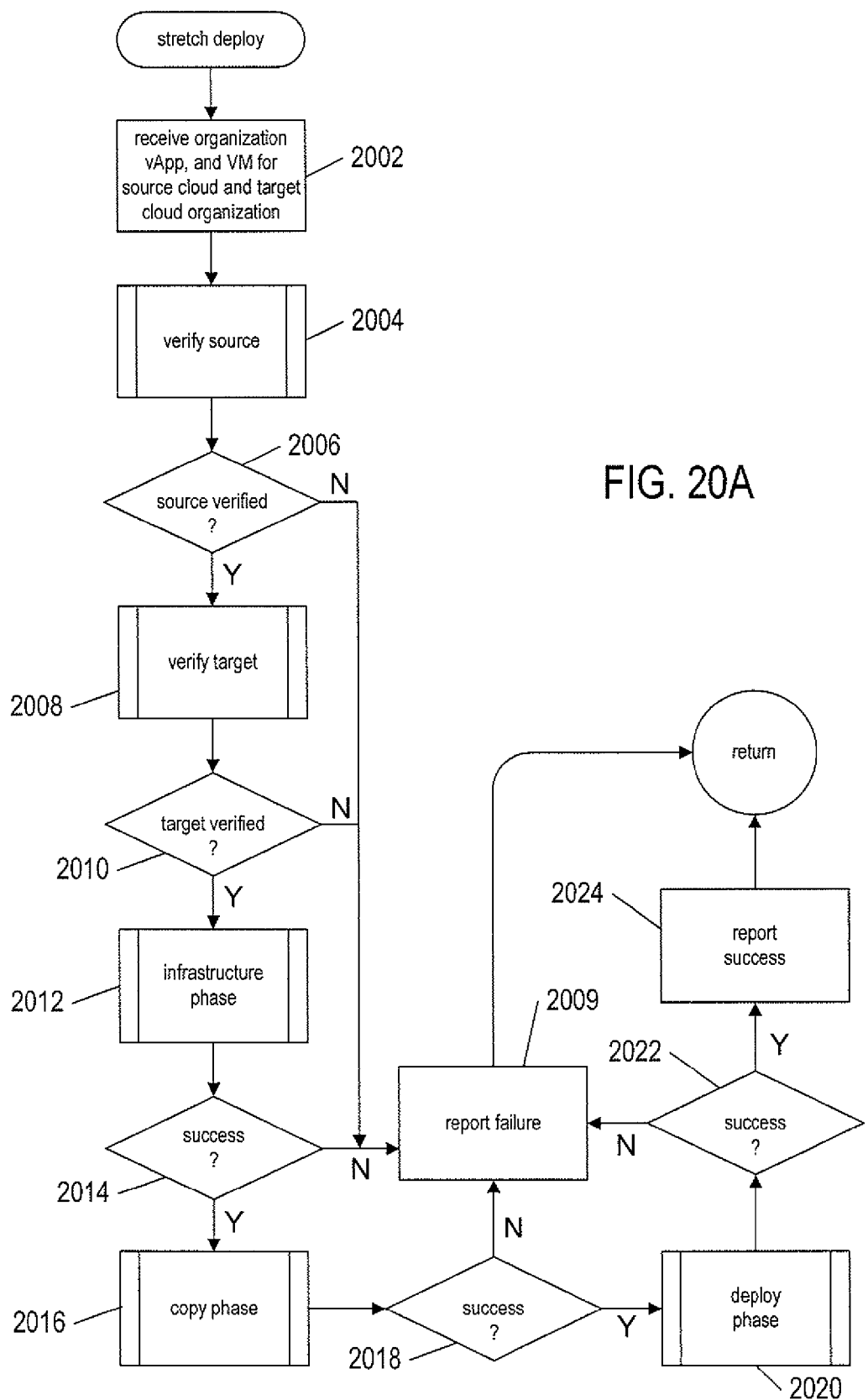
FIGS. 20A-E provide control-flow diagrams that describe one implementation of a stretch-deploy operation.

FIGS. 20A-E provide control-flow diagrams that describe one implementation of a stretch-deploy operation. FIG. 20A shows an overview of the stretch-deploy-operation implementation. In step 2002, the stretch-deploy operation receives information identifying the organization VDC, source cloud, vApp, and VM that is intended to be stretch deployed along with information identifying the target cloud and organization VDC within a target cloud to which the VM or vApp is to be moved. In step 2004, the stretch-deploy operation calls a routine "verify source" to verify that the licenses, configuration, data-storage capacity, and other characteristics of the source cloud, VDC within the source cloud, and vApp containing the VM meet any of various constraints associated with the stretch-deploy operation. When the source has not been verified, as determined in step 2006, then failure is reported in step 2009 and the stretch-deploy operation terminates. Otherwise, in step 2008, the stretch-deploy operation calls a routine "verify target" to verify the various constraints and parameters associated with the target cloud and VDC within the target cloud. When the target is not successfully verified, as determined in step 2010, then failure is reported in step 2009 and the stretch-deploy operation terminates. In step 2012, the stretch-deploy operation carries out the infrastructure phase of the stretch-deploy operation, as discussed above with reference to FIGS. 19A-D. When the infrastructure phase fails to successfully complete, as determined in step 2014, then failure is reported in step 2009 and the stretch-deploy routine terminates, reversing any intermediate steps carried out prior to the failure. In step 2016, the stretch-deploy operation carries out the copy phase, discussed above with reference to FIGS. 19E-F. When the copy phase fails to successfully complete, as determined in step 2018, then the failure is reported in step 2009 after any already completed intermediary steps are reversed. In step 2020, the stretch-deploy operation carries out the deploy phase, discussed above with reference to FIGS. 19G-I. When the deploy phase successfully completes, as determined in step 2022, then success is reported in step 2024 and the stretch-deploy operation terminates. Otherwise, failure is reported in step 2009 after reversing any already-completed intermediate steps, and the stretch-deploy operation terminates.

Figure 20B:
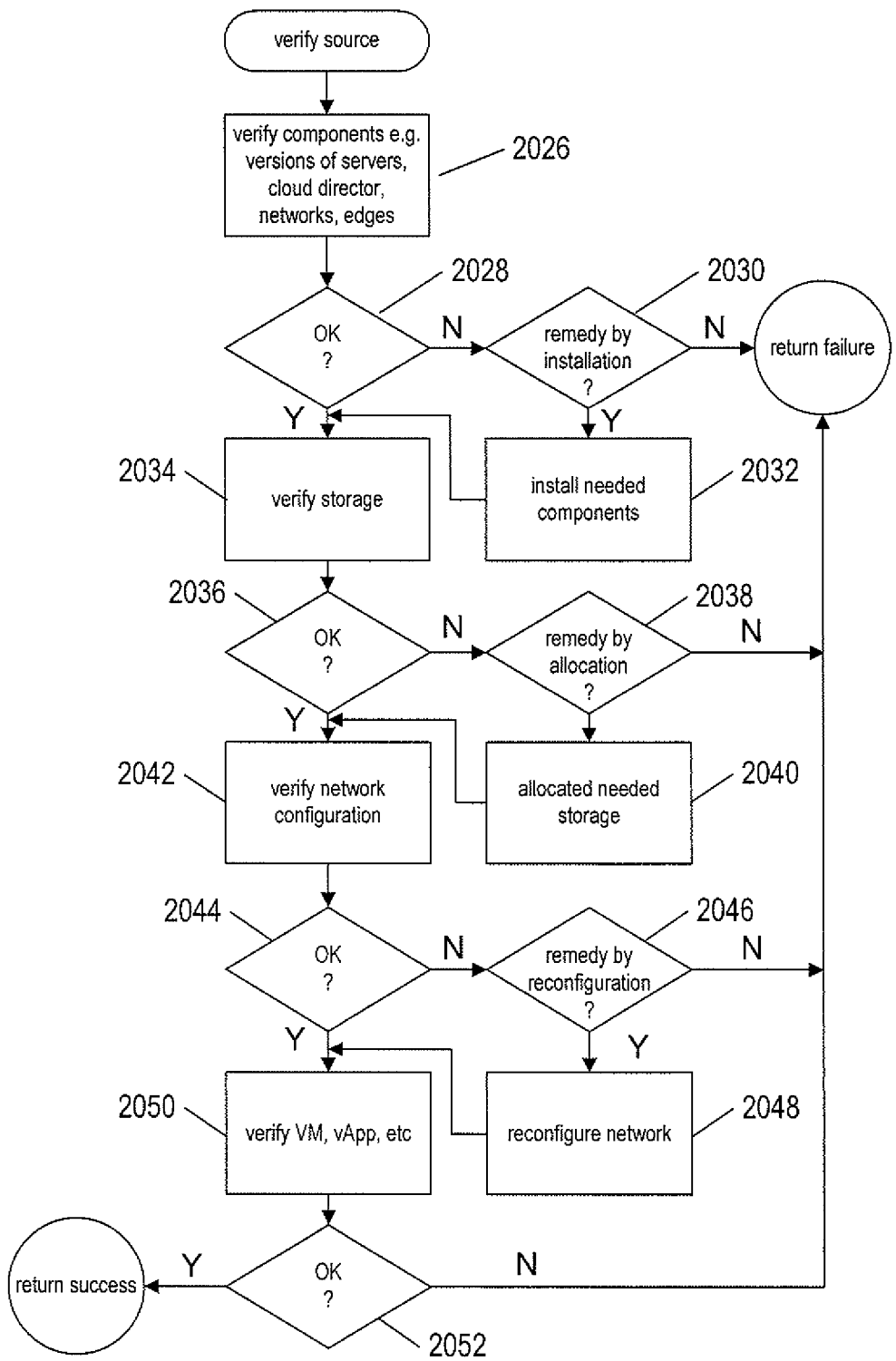

FIG. 20B illustrates the routine "verify source" called in step 2004 of FIG. 20A. In step 2026, the routine "verify source" verifies that all of the properly licensed components needed for stretch deploy are resident within the source cloud, including verifying the versions of various components, the network configuration of the vApp, VM, and organization VDC, the configuration of the organization and edge appliances, and other such aspects and characteristics of the source cloud. When deficiencies are identified, as determined in step 2028, then when the deficiencies can be remedied by installation of components, update of components, or other such remedial operations, as determined in step 2030, then the needed components are installed, updated, or other remedial operations are carried out in step 2032. Otherwise, an indication of failure is returned. In step 2034, the routine "verify source" verifies that there is sufficient virtual storage capacity within the VDC of the source cloud for instantiating a temporary vApp and moving a VM to be stretch deployed into the temporary vApp. When there is not sufficient storage, as determined in step 2036, then when additional storage can be obtained for the VDC, as determined in step 3038, the additional storage is obtained in step 2040. Otherwise, failure is returned. Next, in step 2042, the routine "verify source" verifies all of the network configurations of all of the virtual internal networks and associated edge appliances to ensure that the configurations support the stretch-deploy operation. As one example, in certain implementations, the VM needs to be interconnected by a routed vApp internal network through a virtual organization network to a virtual external network. In addition, the edge appliance associated with the vApp contained in the VM and the organization edge appliance need to support certain basic functionalities, including DHCP. When the network configuration are not adequate to support the stretch-deploy operation, as determined in step 2044, but when the network configurations can be appropriately reconfigured, as determined in step 2046, then network reconfiguration is carried out in step 2048. Otherwise failure is returned. Finally, in step 2050, the routine "verify source" verifies the presence and characteristics of the VM to be moved and the containing vApp. If the verification carried out in step 2050 is successful, as determined in step 2052, then success is returned. Otherwise failure is returned. In the interest of brevity, a control-flow diagram for the routine "verify target," called in step 2009 in FIG. 20A, is not provided, as it would contain much redundant information already contained in FIG. 20B.

Figure 20C:
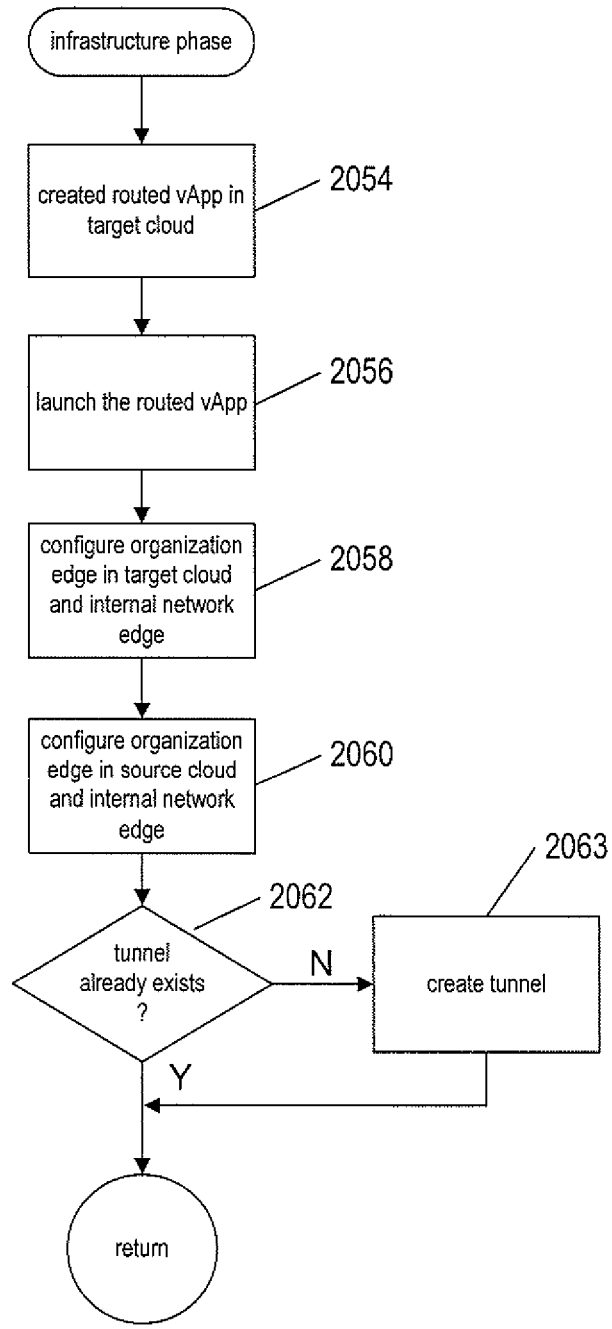

FIG. 20C provides a control-flow diagram for the routine "infrastructure phase," called in step 2012 of FIG. 20A. In step 2054, the routine "infrastructure phase" creates a new empty routed vApp in the target cloud and, in step 2056, launches the routed vApp. In step 2058, the routine "infrastructure phase" configures the organization edge appliance associated with the organization VDC in the target cloud into which the VM will be stretch deployed as well as the internal network edge that connects the internal network of the routed vApp with the organization edge appliance. In step 2060, the organization edge appliance in the source cloud associated with the organization VDC in the source cloud is also configured, along with the internal network edge that formerly connected the internal network of the vApp that contained the moved VM or that was moved to the organization edge appliance in the source cloud. These configuration steps ensure that dynamic network-address translation and various firewall functionalities are provisioned within these edge appliances. Finally, in steps 2062-2063, the routine "infrastructure phase" creates SSL VPN objects in the edge appliances associated with the empty routed vApp in the target cloud and the routed vApp from which the VM will be moved, in the source cloud to establishes a SSL VPN tunnel between the source cloud and target clouds, when a SSL VPN tunnel between the source cloud and target cloud did not previously exist.

The SSL VPN tunnel between the source cloud and target cloud can be multiplexed, according to the current document, to allow multiple stretch-deploy operations between two VDCs within source and target clouds. The multiplexing is carried out by the organization edge appliances at each end of the SSL VPN tunnel. Thus, in the example shown in FIGS. 19A-I, VM 1931 could be stretch-deployed to the target cloud through the same SSL VPN tunnel used to stretch-deploy VM 1930 to the target cloud.

Figure 20D:
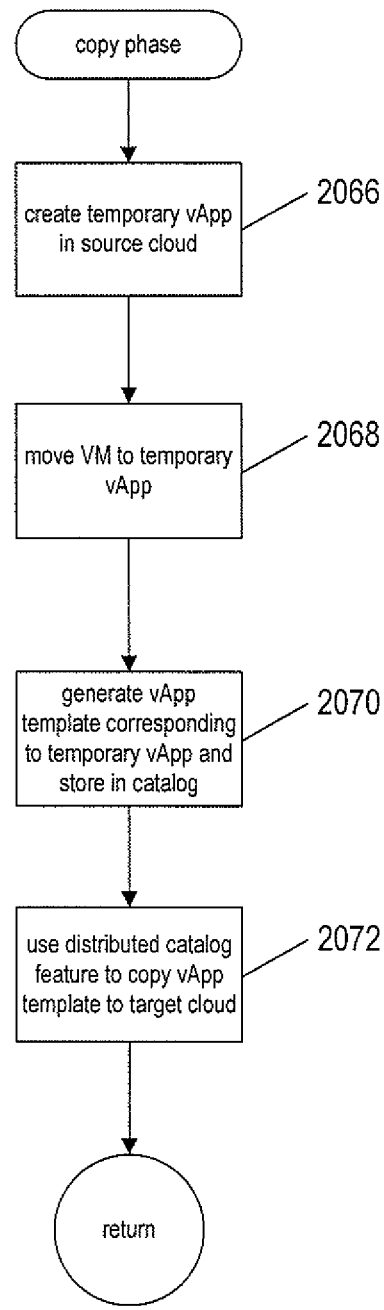

FIG. 20D provides a control-flow diagram of the copy phase of the stretch-deploy operation, called in step 2016 of FIG. 20A. In step 2066, a temporary vApp is created in the source cloud to which, in step 2068, the VM to be stretch deployed is moved. In step 2070, the routine "copy phase" generates a vApp template corresponding to the temporary vApp and stores the vApp template in a catalog. In step 2072, the routine "copy phase" uses a distributed-catalog feature of the virtualization layer to copy the vApp template to the target cloud.

Figure 20E:
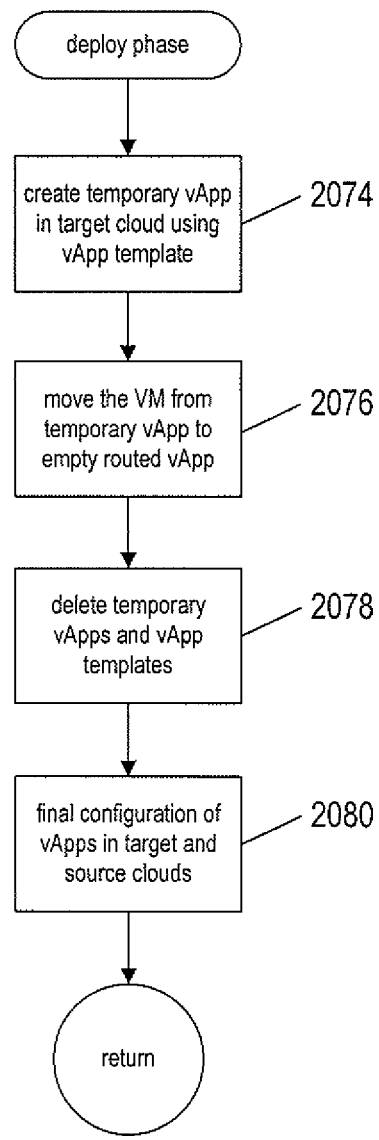

FIG. 20E provides a control-flow diagram for the deploy-phase routine called in step 2020 in FIG. 20A. In step 2074, the routine "deploy phase" creates a temporary vApp in the target cloud using the vApp template generated in step 2070 of FIG. 20D that was distributed from the source cloud to the target cloud using a distributed-catalog feature. In step 2076, the routine "deploy phase" moves the VM from this temporary vApp to the empty routed vApp created in step 2054 in FIG. 20C. In step 2078, the routine "deploy phase" deletes the temporary vApps created in the source and target clouds and removes the vApp templates from the distributed catalog. Finally, in step 2080, the routine "deploy phase" carries out final configuration and parameter-setting operations with respect to the vApps in the target and source clouds.

For the sake of brevity, the failure-detection steps carried out in the infrastructure phase, copy phase, and deploy phase of the stretch-deploy operation are not shown in FIGS. 20C-E. When any of the steps in these figures fail, then either the failure is handled by an additional operation or failure is returned to the stretch-deploy routine shown in FIG. 20A.

Just as a VM can be moved from a source cloud to a target cloud, an entire vApp containing multiple VMs can be moved from a source cloud to a target cloud. A stretch-deployed VM or vApp can also, subsequently, following the stretch-deploy operation be returned to the initial cloud by essentially reversing the steps discussed above with reference to FIGS. 19A-20E.

Extension of Multiple Virtual Networks Through a Single Multiplexed Secure VPN Tunnel The current document discloses a higher-level type of secure-VPN-tunnel-based stretching. In the following discussion, a single secure VPN tunnel is established between organization-edge appliances as a multiplexed VPN tunnel. A multiplexed VPN tunnel allows multiple virtual networks to be extended through the single multiplexed VPN tunnel. Establishment of a multiplexed VPN tunnel does not involve creation of routed vApp networks and other lower-level operations carried out to stretch-deploy a virtual network, but instead involves creating a secure VPN tunnel between organization-edge appliances in two different cloud-computing facilities and configuring the organization-edge appliances.

Figure 21:
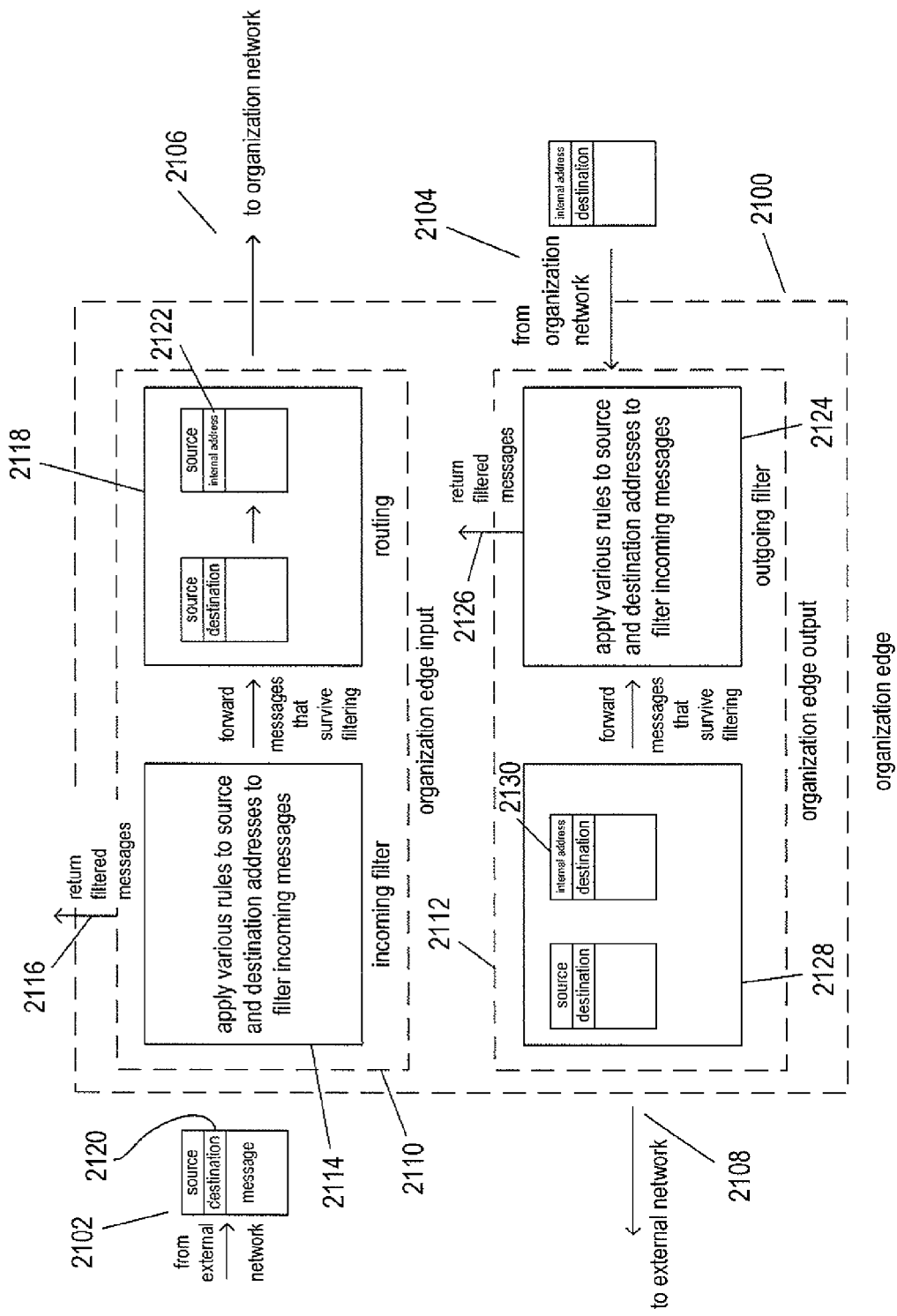
FIG. 21 illustrates, as a block diagram, an organization-edge appliance, such as organization-edge appliances 1918 and 1920 in FIG. 19A, prior to enhancements to allow multiplexed VPN tunnels to be established between organization-edge appliances to facilitate stretch-deploy operations.

FIG. 21 illustrates, as a block diagram, an organization-edge appliance, such as organization-edge appliances 1918 and 1920 in FIG. 19A, prior to enhancements to allow multiplexed VPN tunnels to be established between organization-edge appliances to facilitate stretch-deploy operations. The organization-edge appliance 2100 is shown to receive messages from an external network 2102 and messages from the internal organization network 2104. In FIG. 19A, the external networks for two virtual data centers 1902 and 1904 are shown as external networks 1914 and 1916 and the internal organization networks for virtual data centers 1906 and 1908 are shown as organization networks 1910 and 1912. The organization-edge appliance 2100 outputs messages to the organization network 2106 and to the external network 2108.

The organization-edge appliance is modeled, in FIG. 21, as containing an organization-edge input block 2120 and an organization-edge output block 2112. The organization-edge input block 2110 receives messages from the external network and applies various filtering operations to these messages, generally using the source and destination addresses of the messages, to filter the incoming messages from the external network, a process illustrated in FIG. 21 as an incoming-filter block 2114. Those messages that are filtered by the filter block and prevented from being passed to the internal organization network are either returned to sender or otherwise processed, as represented by arrow 2116. The incoming messages that survive filtering are forwarded to a routing block 2118 which, in certain cases, uses internal routing tables to replace or modify the original destination address 2120 of an incoming message to an internal organization-network address 2122 in order to direct the message to an internal edge appliance that interconnects the organization network with an internal virtual routed vApp network. The organization-edge output block 2112 receives messages from the organization network 2104, applies various rules, using the source and destination addresses included in the messages, to filter those messages, and then routes messages that survive the filtering to the external network 2108. The outgoing filter 2124 of the organization-edge output block 2112 and the incoming filter block 2114 of the organization-edge input block 2110 represent all of the various types of message processing carried out by the organization-edge appliance. Messages that are filtered out of the message stream by the outgoing filter are either returned to the senders or otherwise processed, as represented by arrow 2126. The routing block 2128 of the organization-edge output block 2112 may replace an internal-address source address 2130 within messages processed by the organization-edge output with an external address that can be used by external entities to transmit messages back through the organization-edge appliance 2100 to internal vApps.

The internal edges that interconnect the organization network with internal virtual routed vApp networks can be modeled in similar fashion, with similar filtering and routing components for both the input and output directions. In general, the message processing represented by the incoming filter and outgoing filter in internal-edge appliances and internal-edge-appliance routing differ from the message processing carried out by the incoming and outgoing filters carried out by the organization-edge appliances and the organization-edge-appliance routing, but the overall structure and message flow of the organization-edge appliance and the internal-edge appliances is similar.

In order to support multiplexed VPN tunnels to facilitate stretch-deploy operations between organization-edge appliances, as discussed above with reference to FIGS. 19A-20E, both organization-edge appliances and internal-edge appliances maintain information, in one or more tables, about SSL VPN tunnel and stretch-deployed vApps. FIGS. 22A-B illustrate the types of information stored within an organization-edge appliance to facilitate construction of a VPN tunnel and to facilitate multiple stretch-deploy operations through the VPN tunnel. In a first table 2202 shown in FIG. 22A, each row of the table, such as row 2204, represents a stretch-deployed vApp. In the following discussion, a home data center is the data center in which a VM or vApp was originally located and a local data center is the data center into which a VM or vApp has been stretch-deployed. The stretch-deployed vApp is described, in the table entry, with fields that indicate the home data center of the vApp 2206, the local data center to which the vApp is stretch-deployed 2208, one or more external addresses for the vApp prior to the stretch-deploy operation 2210, one or more corresponding internal addresses used to transmit messages to the vApp prior to the stretch-deploy operation 2212, one or more internal addresses for the stretch-deployed vApp in the new, local data center 2214, and encodings of, or references to, the message processing by the incoming filter and outgoing filter of the internal edge appliance that connected, prior to the stretch-deploy operation, the vApp with the organization and the home data center 2216 and 2218.

A second table 2220 shown in FIG. 22B includes information about each multiplexed SSL VPN tunnel established between an organization-edge appliance and remote organization-edge appliances. Each tunnel is characterized by an identifier for the home data center 2222, an identifier for the local data center 2224, a home VPN tunnel address 2226, and a local VPN tunnel address 2228. Essentially, the home tunnel address 2226 is a communications address that directs messages to the organization-edge appliance within the home data center and the local tunnel address 2228 of the communications address that directs messages to the organization-edge appliance in the local data center. The organization-edge appliances of the home and local data centers represent the end points of the SSL VPN tunnel.

Figure 23A:
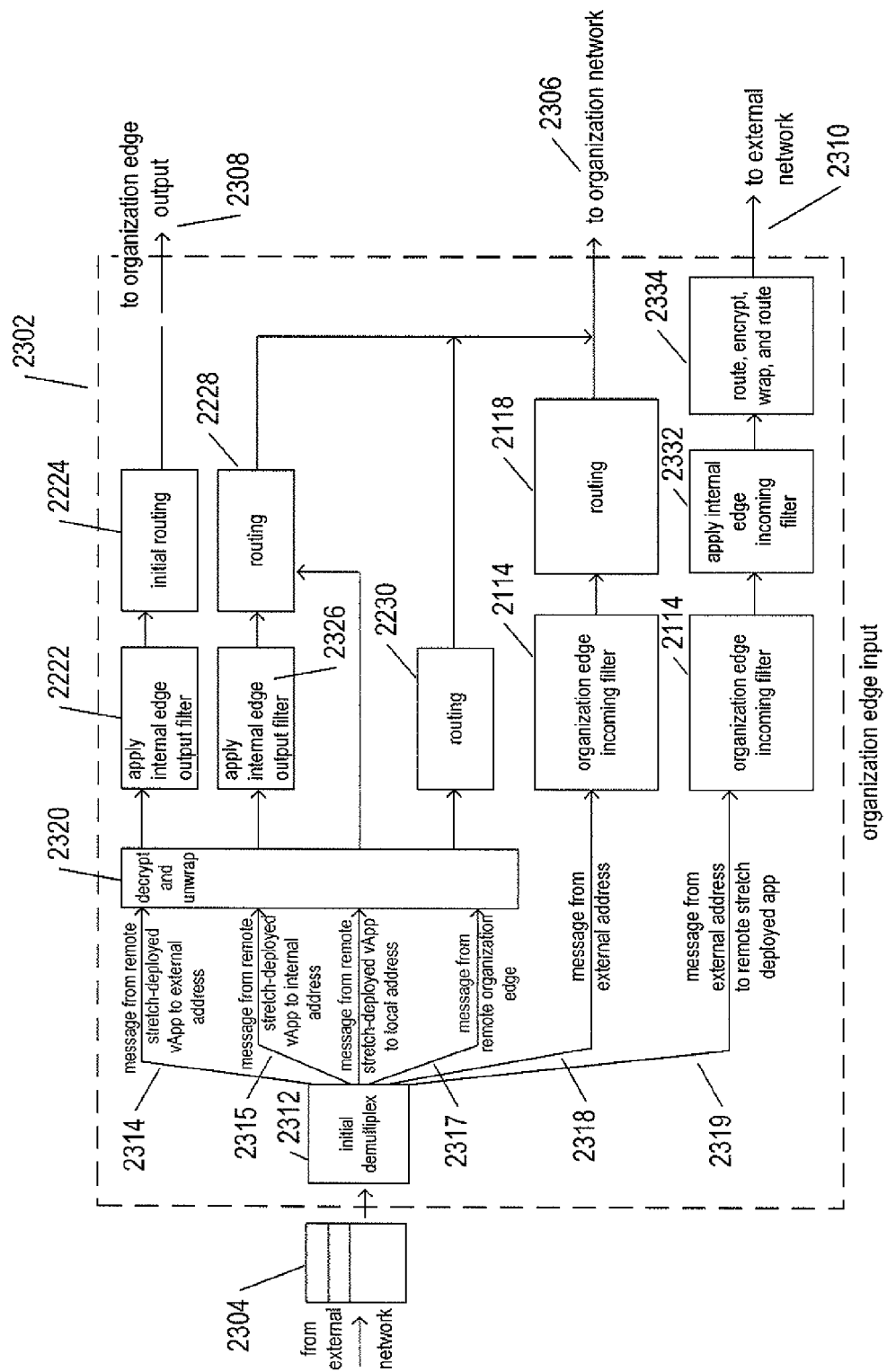
FIGS. 23A-C illustrate enhancements made to the organization-edge appliance, illustrated in FIG. 21, to provide for multiplexing stretch-deploy operations over a single VPN tunnel.
Figure 23B:
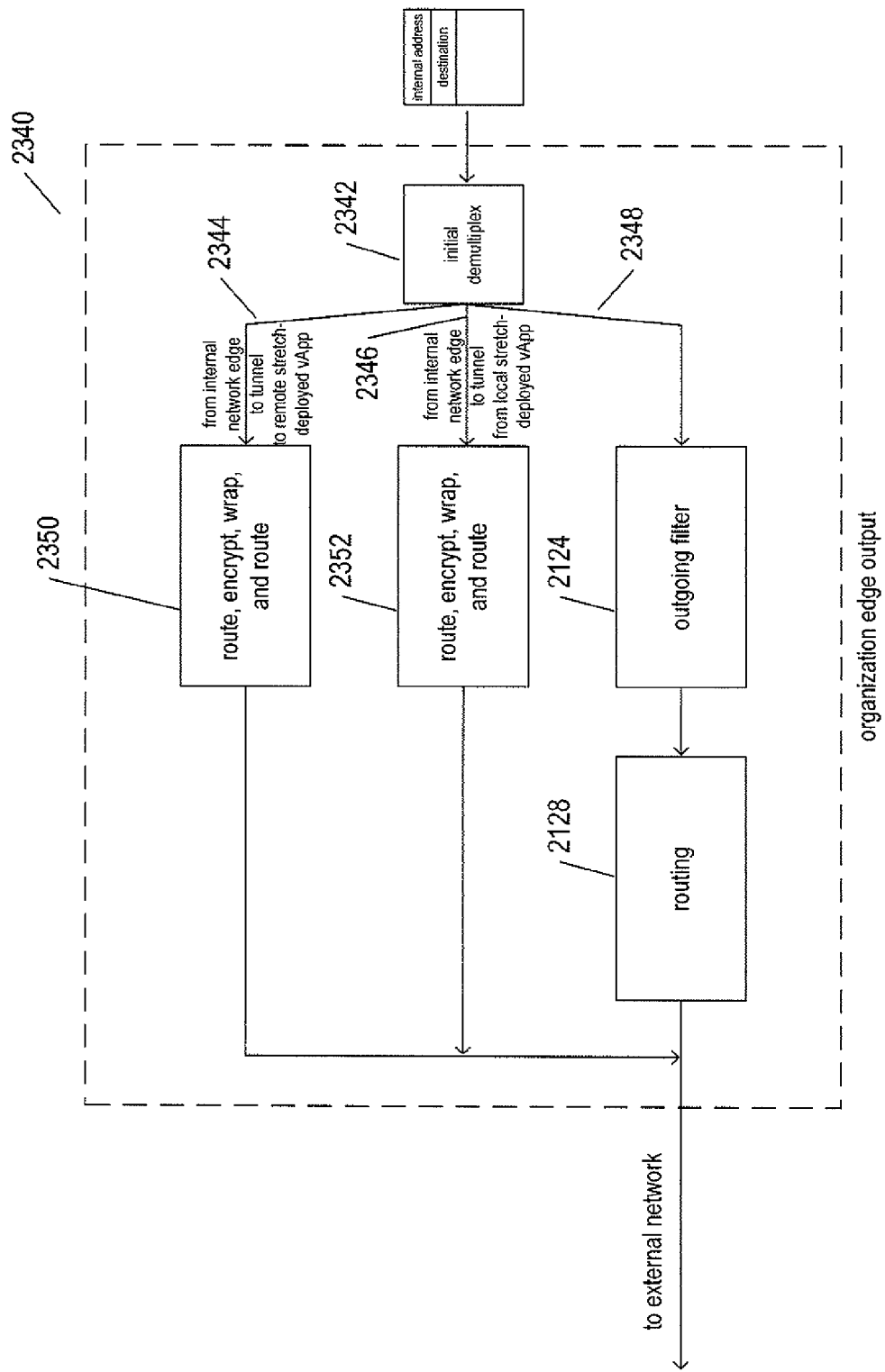
Figure 23C:
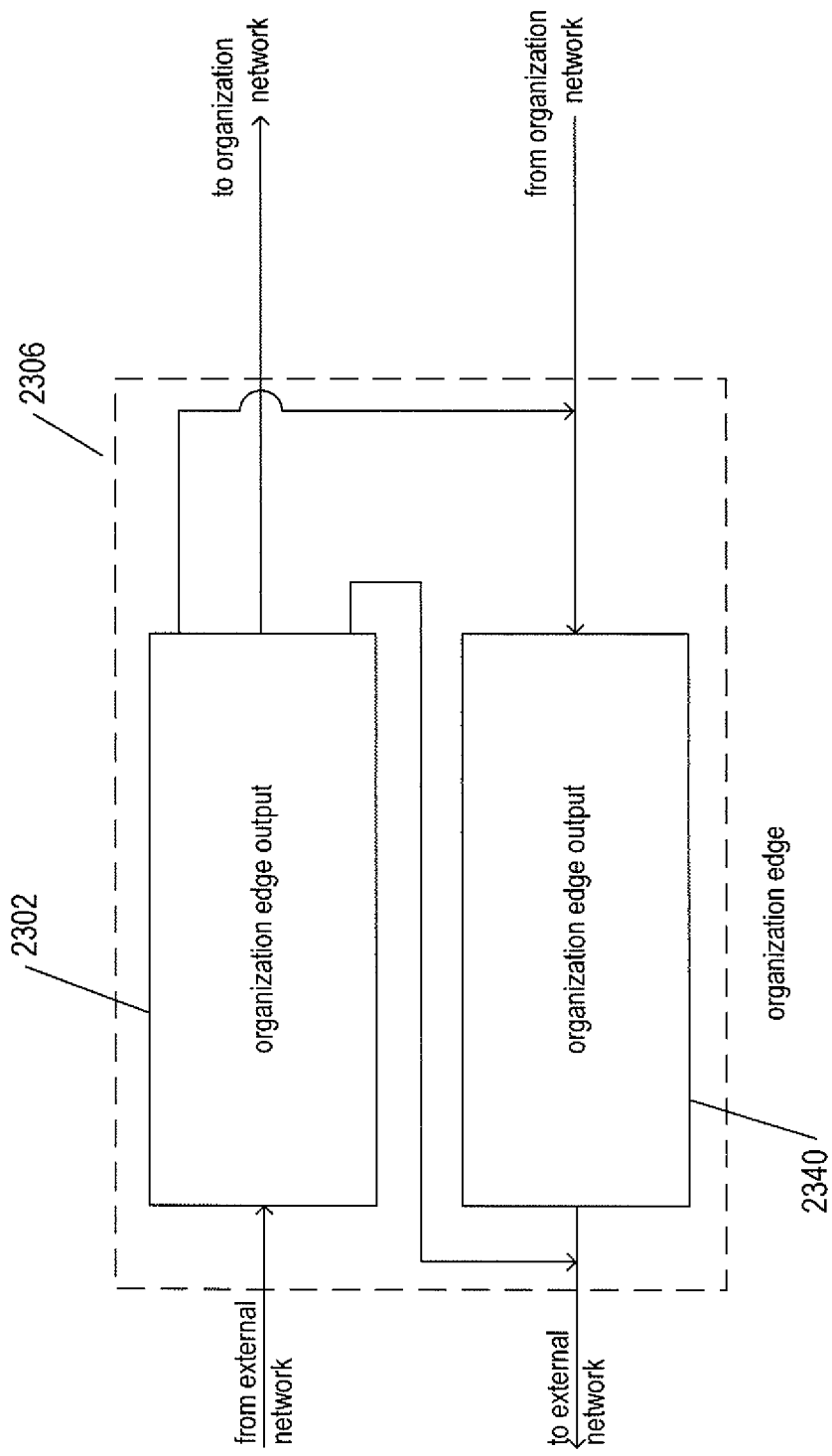

FIGS. 23A-C illustrate enhancements made to the organization-edge appliance, illustrated in FIG. 21, to provide for multiplexing stretch-deploy operations over a single VPN tunnel. FIGS. 23A-C use similar illustration conventions to those used in FIG. 21. FIG. 23A shows an enhanced organization-edge input block 2302 that replaces, in an enhanced organization-edge appliance, organization-edge input block 2110 in FIG. 21. As with the previously described organization-edge input block, the enhanced organization-edge input block 2302 receives messages from an external network 2304 and outputs messages to the organization network 2306. In addition, the enhanced organization-edge input block outputs messages to the input of the organization-edge output block 2308 and outputs messages to the external network 2310. An initial demultiplexing operation 2312 partitions the incoming message stream into six different substreams 2314-2319. In the following discussion, the phrase "remote stretch-deployed vApp" refers to a vApp that has been stretch-deployed to a remote local data center from a home data center that contains the described organization-edge appliance. The phrase "local stretch-deployed vApp" refers to a vApp that has been stretch-deployed from a remote data center to a local data center that includes an organization-edge appliance that is currently being discussed.

The six message substreams produced by the initial demultiplexing operation 2312 include: (1) a data substream of incoming messages 2314 from remote stretch-deployed vApps that are directed to external addresses; (2) a data substream of incoming messages 2315 from remote stretch-deployed vApps directed to addresses internal to the organization data center but external to the particular internal network to which the vApp was connected prior to the stretch-deploy operation; (3) a data substream of incoming messages 2316 from remote stretch-deployed vApps directed to internal addresses local to the internal network to which the stretch-deployed vApps were originally connected; (4) a data substream of incoming messages 2317 from remote organization-edge appliances directed to local stretch-deployed vApps; (5) a data substream of incoming messages 2318 incoming from external addresses and not directed to stretch-deployed vApps; and (6) a data substream of incoming messages 2319 from external addresses directed to remote stretch-deployed vApps. The first four message substreams 2314-2317 are VPN-tunnel messages that have arrived through SSL VPN tunnels. Therefore, in a first processing step, these VPN-tunnel messages are decrypted and unwrapped 2320. Messages from remote stretch-deployed vApps directed to external addresses are processed by applying the internal-edge output filter processing steps, obtained from field 2218 of an entry in the stretch-deployed vApps table, in processing block 2322 and are then initially routed, in processing block 2224, which includes replacing the source address of the message with a source address that would correspond to the vApp had it not been stretch-deployed. Messages are then input to the organization-edge output block 2308, for undergoing the normal output processing before transmission to the external network. Messages received from remote stretch-deployed vApps directed to internal addresses not local to the internal network to which the stretch-deployed vApps were initially connected, within the home data center, are processed by applying the internal-edge output filter operations 2326 and then by routing 2328, as in routing block 2224, before being transmitted to the organization network 2306. Messages from remote stretch-deployed vApps directed to local addresses within the internal network to which the remote stretch-deployed vApps were initially connected are directly sent to the routing processing block 2228, without filtering, before being transmitted to the organization network 2306. The internal-edge appliance also maintains a stretch-deployed vApps table, similar to that discussed with reference to FIG. 22A, that allows the internal-edge appliance to avoid applying an incoming filter to these messages. Messages from remote organization-edge appliances directed to local stretch-deployed vApps are routed to the local stretch-deployed vApps, in routing block 2230, without filtering and transmitted to the organization network 2306. Messages from external entities that are not remote stretch-deployed vApps are processed by a conventional organization-edge incoming filter 2114 and a conventional organization-edge input-block routing block 2118 prior to transmission to the organization network 2306. Messages from external addresses directed to remote stretch-deployed vApps are subject to conventional organization-edge incoming-filter processing 2114 before the internal-edge incoming filter obtained from field 2216 of a stretch-deployed vApps-table entry is applied 2332. Those messages surviving the internal-edge incoming filter are then routed, encrypted, wrapped, and again routed to the proper VPN tunnel 2334. Thus, the organization-edge appliance continues to process many messages from external entities in the same fashion within a conventional organization-edge appliance, but also processes VPN-tunnel messages in order to simulate local presence of remote stretch-deployed vApps.

FIG. 23B shows an enhanced organization-edge output block for an organization-edge appliance enhanced to handle multiple stretch-deployed networks over a single VPN tunnel. The enhanced organization-edge output block 2340 demultiplexes the input stream of messages, in an initial demultiplexing step 2342, into three message substreams 2344, 2346, and 2348. The three substreams include: (1) a substream of messages from internal network-edge appliances directed to remote stretch-deployed vApps 2344; (2) messages from internal network edges from local stretch-deployed vApps 2346; and (3) all other incoming messages 2348. The final message substream is processed by a traditional outgoing filter 2124 and routing 2128. Messages from internal network edges directed to remote stretch-deployed vApps are routed, encrypted, wrapped, and then routed to the appropriate VPN tunnel 2350 for transmission to the remote stretch-deployed vApps via the external network. Similarly, messages transmitted by internal network edges on behalf of local stretch-deployed vApps are initially routed, encrypted, wrapped, and routed to the appropriate VPN tunnel, in processing block 2352, before transmission to the external network.

FIG. 23C illustrates, using block-diagram conventions, an enhanced organization-edge appliance. The enhanced organization-edge appliance 2360 includes an organization-edge input block 2302, as illustrated in FIG. 23A, and an organization-edge output block 2340, as illustrated in FIG. 23B.

FIGS. 24A-25B illustrate certain of the variety of compression and deduplication processing that can be carried out by enhanced organization-edge appliances for messages transmitted over multiple stretch-deployed networks multiplexed within a single VPN tunnel. FIG. 24A shows a large circular queue or buffer 2402 that buffers messages prepared for transmission through a VPN tunnel. Messages are input to the circular buffer from an organization-edge appliance 2406 and dequeued and output from the circular queue 2408, one at a time, for transmission to an external network. However, as shown in FIG. 24B, for those messages residing within the output queue 2402 that include identical message bodies or message bodies that contain common portions, illustrated in FIG. 24B by cross-hatching 2410-2415, the messages containing identical message bodies or message bodies with common portions can be collected together into a combined message 2420 that is sent through a VPN tunnel to a remote organization-edge appliance. The remote organization-edge appliance can then transform the combined message 2420 back into individual messages transmitted internally to remote and local stretch-deployed vApps. In this fashion, the redundant transmission of information over a VPN tunnel can be significantly decreased.

FIGS. 25A-B illustrate two different types of combined messages. In one type of combined message 2502 shown in FIG. 25A, a large number of individual messages within an output queue having identical message bodies are combined into a combined message with a series of source-address and destination-address pairs 2504-2509, and other header information, extracted from the original messages and a single copy 2510 of the common message body. In FIG. 25B, a different type of combined message 2520 is shown in which a single copy of a common portion 2522 of multiple output-queue messages is included and only the non-common portions of three messages 2524-2526 are included within the combined message 2520 along with references 2528-2530 to the common portion 2522. Even more complex types of combined messages are possible, in which the message body of queued messages are broken down into chunks or blocks and only a single copy of common chunks or blocks are included in the combined message with appropriate references from compressed messages included in the combined message. Many other types of compression are also possible. In more complex implementations, messages may be buffered for longer periods of time at both ends of a VPN tunnel, following transmission, with appropriate coordination and updating between the organization-edge appliances at the ends of the VPN tunnel in order to carry out deduplication and compression over much longer periods of time and over a greater number of messages.

Although the present invention has been described in terms of particular embodiments, it is not intended that the invention be limited to these embodiments. Modifications within the spirit of the invention will be apparent to those skilled in the art. For example, the stretch-deploy operation can be implemented in many different ways by varying any of many different design, implementation, and deployment parameters, including the virtualization layer in which the stretch-deploy operation is implemented, programming language, control structures, data structures, modular organization, and other such design and implementation parameters. In the above-discussed implementation of a stretch-deploy operation, much of the logic involved in the stretch-deploy operation is contained within existing virtualization-layer features, including a distributed catalog for publishing vApp templates, creation of SSL VPN tunnels between edge appliances, and the well-developed virtualization-layer support for various types of virtualized internal networks. In alternative implementations, within virtualization layers that lack some or all of these existing features, similar or alternative functionality can be developed as part of the stretch-deploy operation. Many of the constraints associated with the stretch-deploy operation are tied to specific implementations.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A cloud-connector subsystem that provides a stretch-deploy operation for moving one or more virtual machines and virtual applications, which execute in a source cloud-computing facility, to a target cloud-computing facility, where the one or more virtual machines and virtual applications resume executing, the cloud-connector subsystem comprising:

a cloud-connector node associated with the source cloud-computing facility;

a cloud-connector node associated with the target cloud-computing facility; and a cloud-connector server that includes one or more processors, one or more memories, one or more data-storage devices, and computer instructions that, when executed on the one or more processors, control the cloud-connector server to provide, in cooperation with the cloud-connector nodes, a stretch-deploy operation that:

extends a first local virtual network within the source cloud-computing facility, to a second local virtual network, within the target cloud-computing facility, through a secure tunnel that supports multiple extended virtual networks, forming an extended local virtual network, by:

verifying the source cloud-computing facility and one or more virtual machines and virtual applications to be moved, verifying the target cloud-computing facility, creating a routed virtual application within the second local virtual network, launching execution of the routed virtual application within the target cloud-computing facility, and when a secure tunnel has not already been created between a first and second organization edge appliances, creating a secure tunnel between the first organization edge appliance, associated with the first local virtual network, and the second organization edge appliance, associated with the second local virtual network, and moves the one or more virtual machines and virtual applications from executing on the source cloud-computing facility and communicating with other computational entities through the extended local virtual network using one or more network addresses to executing on the target cloud-computing facility and communicating with other computational entities through the extended local virtual network using the same one or more network addresses.

2. The cloud-connector subsystem of claim 1 wherein the one or more one or more virtual machines and virtual applications comprises one of:

a single virtual machine;

two or more virtual machines;

a single virtual application including a single virtual machine; and a single virtual application including two or more virtual machines.

3. The cloud-connector subsystem of claim 1, wherein the first local virtual network is connected through a first internal edge appliance to a first organization virtual network within the source cloud computing facility that, in turn, is connected to an external network through the first organization edge appliance; and wherein the second local virtual network is connected through a second internal edge appliance to a second organization virtual network within the target cloud computing facility that, in turn, is connected to an external network through the second organization edge appliance.

4. The cloud-connector subsystem of claim 3 wherein the secure tunnel is an SSL VPN tunnel.

5. The cloud-connector subsystem of claim 3 wherein the cloud-connector subsystem verifies a cloud-computing facility by:

determining that those components of the cloud-computing facility used in the stretch-deploy operation are present, configured, and licensed; and determining that the cloud-computing facility has sufficient storage capacity for instantiating a temporary virtual application.

6. The cloud-connector subsystem of claim 1, wherein the stretch-deploy operation moves the one or more virtual machines by executing a copy phase, the copy phase comprising:

creating a first temporary virtual application in the source cloud-computing facility;

moving the one or more virtual machines to the first temporary virtual application;

generating a virtual application template corresponding to the temporary virtual application; and copying the virtual application template to the target cloud-computing facility.

7. The cloud-connector subsystem of claim 1, wherein the stretch-deploy operation moves the one or more virtual machines by executing a deployment phase, the deployment phase comprising:

creating a second temporary virtual application in the target cloud-computing facility from the virtual application template copied to the target cloud-computing facility; and moving the one or more virtual machines from the second temporary virtual application to the routed virtual application in the target cloud-computing facility.

8. A method that relocates one or more virtual machines and virtual applications connected to a first local virtual network within a source cloud-computing facility to a target cloud-computing facility, the method comprising:

a cloud-connector node associated with the source cloud-computing facility;

a cloud-connector node associated with the target cloud-computing facility; and a cloud-connector server that includes one or more processors, one or more memories, one or more data-storage devices, and computer instructions that, when executed on the one or more processors, control the cloud-connector server to provide, in cooperation with the cloud-connector nodes, a stretch-deploy operation that:

extends a first local virtual network within the source cloud-computing facility, to a second local virtual network, within the target cloud-computing facility, through a secure tunnel that supports multiple extended virtual networks, forming an extended local virtual network, by:

verifying the source cloud-computing facility and one or more virtual machines and virtual applications to be moved, verifying the target cloud-computing facility, creating a routed virtual application within the second local virtual network, launching execution of the routed virtual application within the target cloud-computing facility, and when a secure tunnel has not already been created between a first and second organization edge appliances, creating a secure tunnel between the first organization edge appliance, associated with the first local virtual network, and the second organization edge appliance, associated with the second local virtual network, and moves the one or more virtual machines and virtual applications from executing on the source cloud-computing facility and communicating with other computational entities through the extended local virtual network using one or more network addresses to executing on the target cloud-computing facility and communicating with other computational entities through the extended local virtual network using the same one or more network addresses.

9. The method of claim 8, wherein the one or more one or more virtual machines and virtual applications comprises one of:
- a single virtual machine;
- two or more virtual machines;
- a single virtual application including a single virtual machine; and
- a single virtual application including two or more virtual machines.

10. The method of claim 8,
wherein the first local virtual network is connected through a first internal edge appliance to a first organization virtual network within the source cloud computing facility that, in turn, is connected to an external network through the first organization edge appliance; and
wherein the second local virtual network is connected through a second internal edge appliance to a second organization virtual network within the target cloud computing facility that, in turn, is connected to an external network through the second organization edge appliance.

11. The method of claim 10 wherein the secure tunnel is one of:
- an SSL VPN tunnel; and
- an IPsec tunnel.

12. The method of claim 8, wherein verifying a cloud-computing facility further comprises:
- determining that those components of the cloud-computing facility used in the stretch-deploy operation are present, configured, and licensed; and
- determining that the cloud-computing facility has sufficient storage capacity for instantiating a temporary virtual application.

13. The method of claim 8, wherein the stretch-deploy operation moves the one or more virtual machines by executing a copy phase, the copy phase comprising:
- creating a first temporary virtual application in the source cloud-computing facility;
- moving the one or more virtual machines to the first temporary virtual application;
- generating a virtual application template corresponding to the temporary virtual application; and
- copying the virtual application template to the target cloud-computing facility.

14. The method of claim 8, wherein the stretch-deploy operation moves the one or more virtual machines by executing a deployment phase, the deployment phase comprising:
- creating a second temporary virtual application in the target cloud-computing facility from the virtual application template copied to the target cloud-computing facility; and
- moving the one or more virtual machines from the second temporary virtual application to the routed virtual application in the target cloud-computing facility.

15. Computer instructions stored within a non-transitory physical data-storage device that, when executed on one or more processors within a cloud-connector subsystem, control the cloud-connector subsystem to relocate one or more virtual machines and virtual applications connected to a first local virtual network within a source cloud-computing facility to a target cloud-computing facility by:
- using a cloud-connector node associated with the source cloud-computing facility;
- using a cloud-connector node associated with the target cloud-computing facility; and
- providing, in cooperation with the cloud-connector nodes, a stretch-deploy operation that:
  - extends a first local virtual network within the source cloud-computing facility, to a second local virtual network, within the target cloud-computing facility, through a secure tunnel that supports multiple extended virtual networks, forming an extended local virtual network, by:
    - verifying the source cloud-computing facility and one or more virtual machines and virtual applications to be moved,
    - verifying the target cloud-computing facility,
    - creating a routed virtual application within the second local virtual network,
    - launching execution of the routed virtual application within the target cloud-computing facility, and
    - when a secure tunnel has not already been created between a first and second organization edge appliances, creating a secure tunnel between the first organization edge appliance, associated with the first local virtual network, and the second organization edge appliance, associated with the second local virtual network, and
  - moves the one or more virtual machines and virtual applications from executing on the source cloud-computing facility and communicating with other computational entities through the extended local virtual network using one or more network addresses to executing on the target cloud-computing facility and communicating with other computational entities through the extended local virtual network using the same one or more network addresses.

16. The computer instructions of claim 15,
wherein the first local virtual network is connected through a first internal edge appliance to a first organization virtual network within the source cloud computing facility that, in turn, is connected to an external network through the first organization edge appliance; and
wherein the second local virtual network is connected through a second internal edge appliance to a second organization virtual network within the target cloud computing facility that, in turn, is connected to an external network through the second organization edge appliance.

* * * * *